(12) United States Patent
Kitchin et al.

(10) Patent No.: US 9,362,753 B2
(45) Date of Patent: *Jun. 7, 2016

(54) EXTENDED SIGNALING SYSTEM AND METHOD

(71) Applicant: Cottonwood Creek Technologies, Centennial, CO (US)

(72) Inventors: Dwight W. Kitchin, Parker, CO (US); Alan K. Schott, Centennial, CO (US)

(73) Assignee: COTTONWOOD CREEK TECHNOLOGIES, INC., Centennial, CO (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/086,496

(22) Filed: Nov. 21, 2013

(65) Prior Publication Data

US 2014/0077589 A1    Mar. 20, 2014

Related U.S. Application Data

(63) Continuation of application No. 12/553,849, filed on Sep. 3, 2009, now Pat. No. 8,594,314.

(60) Provisional application No. 61/191,083, filed on Sep. 5, 2008.

(51) Int. Cl.
*H04M 3/00* (2006.01)
*H04M 5/00* (2006.01)
*H02J 4/00* (2006.01)
*H04M 19/00* (2006.01)

(52) U.S. Cl.
CPC ............... *H02J 4/00* (2013.01); *H04M 19/005* (2013.01)

(58) Field of Classification Search
CPC . H04M 19/005; H04M 19/001; H04M 19/00; H04M 3/005

USPC .................................................. 379/324, 331
See application file for complete search history.

(56) References Cited

U.S. PATENT DOCUMENTS

| | | | | |
|---|---|---|---|---|
| 3,639,692 A | * | 2/1972 | Krasin | H04M 19/04 370/485 |
| 4,685,129 A | * | 8/1987 | Gavrilovich | H04M 19/06 379/324 |
| 4,864,609 A | * | 9/1989 | Moisin | H04M 19/003 379/413 |
| 5,482,467 A | * | 1/1996 | Nolf | H01R 4/2416 439/161 |
| 6,115,226 A | * | 9/2000 | Mckenney | H02H 9/042 361/104 |
| 8,344,874 B2 | | 1/2013 | Fadell | |
| 2002/0019984 A1 | * | 2/2002 | Rakib | G08B 13/19656 725/111 |
| 2006/0153241 A1 | * | 7/2006 | Czerwiec | H04M 11/062 370/493 |

* cited by examiner

*Primary Examiner* — Alexander Jamal

(57) ABSTRACT

Embodiments are described that include a "front end" device located remotely from a local telephone location. The front end filters DC and AC current on a telephone line to separate these signals and passes a DC current through a low resistance Low Pass Filter without traditional resistance or current limiting means. The front end also provides signaling capability isolated from the DC and audio channels by a High Pass Filter. Some embodiments also include a "back end" unit located near a local telephone location. The "back end" unit filters the DC and AC currents into at least two DC current streams. One of the DC current streams provides sufficient current to power a local telephone. The other stream(s) provides current sufficient to power an auxiliary device. The "back end" device may also provide signaling isolated from the DC and audio channels that is complementary to the "front end" signaling.

24 Claims, 6 Drawing Sheets

POTS Configuration "PRIOR ART"

EXTENDED SIGNALING SYSTEM AND METHOD

I. RELATED APPLICATION

This application is a continuation of U.S. patent application Ser. No. 12/553,849 titled "EXTENDED SIGNALING SYSTEM AND METHOD," filed Sep. 3, 2009, which is hereby incorporated by reference in its entirety, and which claims the benefit of U.S. Provisional Patent Application Ser. No. 61/191,083 titled "EXTENDED SIGNALING SYSTEM AND METHOD" filed on Sep. 5, 2008, which is hereby incorporated by reference in its entirety.

II. FIELD OF THE INVENTION

The present invention relates to a device and method to enable a finite electrical power source to deliver more power to the point of use over a defined transmission channel and provide additional signaling capability between the termination points of the defined transmission channel.

III. BACKGROUND OF THE INVENTION

Traditionally, "plain old telephone service" or "POTS" has been facilitated using a low voltage, low current combination of DC and AC signals transmitted over the telephone network to a local telephone. This has been sufficient to power the functionality of a simple telephone and to generate, transmit, and receive modulated AC signals for voice transmission. The electrical current necessary to enable operation of a local telephone is typically about 25 milliamps.

Modern telephones have an expanded array of features such as visual displays, speakerphones, recording/messaging, portable handset and other capabilities. The power necessary to enable these capabilities exceeds what is available from the telephone network at a local telephone. Simply stated, telephone network current is not sufficient to power anything but the telephone itself. As a result, one or more additional external power supply units are required to furnish the necessary capability. Frequently, these power supply units take the form of AC/DC adaptors that are plugged into a standard 110 AC wall socket and the output of which is connected to the telephone or peripheral devices. These so-called "wall-warts" provide the additional power required to support the added functions/capabilities and devices (e.g., battery operated wireless handset) associated with the telephone.

Likewise if electronic "data" services, such as ISDN or DSL, are to be transported on the same pair of conductors to, or near to, the local telephone instrument, yet another "wall-wart" is almost certainly required to power the associated modem device. For convenience these telephone instruments and modem power sources are referred to as being "AC line powered."

While wall-warts are unsightly and cumbersome they are acceptable for most purposes to provide the additional power (i.e., power beyond what is supplied by the CO/CB/SLC/IAD/PBX over the telephone network) to AC line powered devices.

Nevertheless, there are situations where some telephone-related capability or feature is desired that requires additional power but is located in an environment where AC line power is not available. This can be the case wherever wiring was put in place specifically for telephone applications. Existing incarceration facilities, particularly older prisons and jails, are one example of such an environment. These institutions typically provide POTS telephone services as an amenity for the inmates to conduct necessary and/or interpersonal communications with those on the "outside." Recently, such institutions have desired to supplement POTS service with additional capabilities. For example, it is highly desirable to increase the accuracy of inmate identification required to access outside phone service by using fingerprint, barcode, RFID, or other types of readers that can identify or verify the inmate by thumb print, palm print, voice print, retinal scan, or another idiosyncratic physical characteristic, or information embedded within a wristband. It is also desirable to enable a telephone with visual two-way camera and picture capability so that the phone can be used as a vehicle for remote visitation from a site near to or far from that of incarceration to avoid excess prisoner movement.

Penal institutions are also finding it increasingly desirable to provide limited Internet or more commonly a restricted service Intranet access to inmates for purposes of accessing an inmate account, conducting transactions, etc., all of which require a modem or similar device to connect to the Intranet via the telephone network. All of these peripheral devices require additional power. A typical peripheral device may require about 60-70 milliamps at some low voltage such as 3-12 VDC. When one or more of these peripheral devices are desired, power requirements may exceed more than 125 milliamps. The equivalent power required for these devices is far in excess of the 25 milliamps available and intended to operate the telephone itself. The DC current available from the telephone network typically barely exceeds the 18-20 milliamp minimum requirement recommended for reasonable conversation quality.

Due to the understandably unique requirements of such facilities, certain infrastructure features available in other buildings, e.g., crawl spaces, hollow walls, AC outlets, are simply not permitted adjacent to or near the physical locations where a telephone or telephone and data device may be desired or needed. Absent the access that may be available in a more typical structure the cost of rewiring for example from a 25-pair cable distributed to many cell blocks and individual station locations to separate CAT-5 cables is simply cost prohibitive, often by orders of magnitude. Likewise the cost to provide new AC power near to the required location, and provide that power source with appropriate physical security for both the outlets, the 'wall-warts', and the low voltage from the warts to the actual instruments is usually little short of astronomic. And neither option, even if financially possible, could be accomplished in a time frame similar to that required in a commercial building situation due to the security, controlled access, and physical detritus and debris related to such an undertaking.

Nevertheless, there are emerging pressures (e.g., service delivery, social pressure, cost containment, and manpower reduction reasons) to provide newer telephony related and additional service delivery instruments to these same facilities and difficult locations.

In the absence of available AC power, there are two possible solutions. First, replace the existing POTS, or POTS-like wire pair with either a larger gauge wire or greater number of conductors to each telephone to reduce the resistance to current and facilitate the delivery of greater power to the telephone location. For example, a single UTP could be replaced with a full CAT5 quad pair cable. In many inmate or similar facilities, this is not realistic or perhaps even possible for many of the same reasons that it is not possible to supply AC power.

More recently, it has been proposed to "bleed" a small amount of excess current not required for powering the telephone to charge one or more local batteries that would then be used to provide power to the device (e.g. fingerprint reader) supplying the supplemental capability or feature. This implementation has the disadvantage of requiring a 'recharge' time period between instances of device use and cannot be relied upon to provide adequate power in situations of high-use or unexpected use patterns. Using a fingerprint reader as an example, the taking of a fingerprint reading and transmitting that information through the network for verification would result in at least some discharge of the battery while powering the fingerprint reader. Since the fingerprint reader is likely to require much more power than is available from the telephone line to charge the battery, the state of the battery charge will be diminished and will eventually, through constant use, be unable to provide adequate power to operate the fingerprint reader. The device user must now wait some period of time until the battery has time to recharge to a usable threshold before the user can continue his use of the device. A simple misdial of the telephone number and subsequent redial by the user could possibly cause enough discharge of the supply battery to fail the redial attempt which is deemed to be unacceptable operation for most applications.

The use of various example identification enhancement devices mentioned above entails a variety of, typically low speed, controls and communications protocols to, for example, enable and disable a device, provide operational instructions to the device user, and the communication of results or other output from the device to a decision making point such as a centralized control system.

In the current implementations of many of these devices they are always powered whether needed or not, instructions to the user are often provided by playback of a verbal recording from a centralized control system, and the device results are transmitted via DTMF or other audible signaling means. The local telephone instrument is commonly utilized to provide the user instructions which tends to extend the call setup time but in any case prevents the use of the local telephone for its primary purpose when being used to provide instructions. Likewise when the external device such as a biometric characteristic reader is reporting its findings by the use of DTMF tones additional time is required within the overall call setup process. It is no longer an over-zealous concept to deactivate power using devices when not actively performing a function but most current biometric devices will, at best, move to some form of lower power state when not actively performing their respective biometric functions but generally have no means to deactivate when not required for a particular, or over an extended, period of time. The use of DTMF signaling to communicate results can have the additional disadvantage of providing audible clues to inmates in a penal institution situation or for third parties to record otherwise secure information. In either case the information can later be mimicked or used for unintended purposes.

Accordingly, a need exists to supply additional power over the existing delivery system infrastructure to provide greater power at the local telephone location to enable both the normal operation of the telephone and additional capabilities, features or devices. Likewise a need exists to provide some level of control and signaling over that same delivery system that does not use the bandwidth originally provided for telephone conversations. It is with respect to these and other considerations that embodiments of the present invention have been made. Although relatively specific problems have been discussed, it should be understood that embodiments of the present invention should not be limited to solving the specific problems identified in the background.

IV. SUMMARY OF THE INVENTION

The deficiencies of the prior art are solved using the method and system of the present invention. In embodiments, the invention enables a finite source of DC and AC current typically provided to enable use of a telephone to deliver more current through a previously defined transmission channel between the source and the local telephone and also provides a mechanism to exchange telephony and non-telephony related signals, in the form of states or data, between a distribution location and equipment associated with the local telephone or telephony related instrument. While the typical −48 VDC powered telephone line is only sufficient to provide about 25 milliamps of DC current to a local telephone instrument over its existing infrastructure, the invention in embodiments permits that same −48 VDC level to deliver a current in excess of 25 milliamps to the same telephone or instrument location over the same existing wiring and infrastructure while adding additional signaling capabilities. This is accomplished by employing a "front end" device typically located at a point in the transmission channel remote from the local telephone such as at the service entrance of the network into the building or at an appropriate distribution frame. The front end performs several functions including filtering the DC and AC current on the transmission channel to separate these signals and passing the DC current through a low ESR (equivalent series resistance) LPF (Low Pass Filter) without traditional additional resistance or current limiting means and resettable fuses to prevent damage to the source of DC and AC current in the event of a short circuit or other overload condition. Typically, the fuses replace one or more series resistances or other devices that are generally employed to protect the network from electrical short conditions, but have the disadvantage of adding significant resistance to the flow of electrical current. The front end also provides an audio (speech frequency range) channel for telephony communications use isolated from the DC path by a BPF (Band Pass Filter) as well as a high frequency (out of band) signaling capability isolated from the DC and audio channels by a HPF (High Pass Filter). The system also employs a "back end" unit located at a point on the transmission channel at or near the local telephone location. The "back end" unit splits the DC and AC currents into at least two DC current streams. One of those streams provides sufficient current to power the local telephone. The other stream(s) provides current sufficient to power additional capabilities, features or devices associated with the local telephone, such as a biometric reader. The back end unit also splits the AC signals into an audio channel, via a LPF, for telephony conversation purposes as well as to an out-of-band signaling channel, via a HPF, for state and/or data signaling purposes. By use of this methodology and system, the same power source can deliver 40-60 milliamps or more to the local telephone and associated peripheral devices instead of the usual 25 milliamp current. By the application of a power conversion subsystem the extra current not utilized by the local telephone is converted to a lower voltage but yet higher current which is made available to external devices such as the example biometric reader. For example, the system can provide 100 milliamps or more at 5 volts to such an external device associated with a local telephone or similar use device over 4000 feet of standard 24 AWG UTP in addition to one or more out-of-band signaling channels and still provide normal telephone communication capabilities.

This summary is not intended to identify key features or essential features of the claimed subject matter and should not be used to narrow the scope of the claimed subject matter. This summary is provided only to generally provide a description of some of the embodiments of the present invention.

V. BRIEF DESCRIPTION OF THE DRAWINGS

VI. DETAILED DESCRIPTION OF THE INVENTION

The principles of the present invention may be further understood by reference to the following detailed description and the embodiments depicted in the accompanying drawings. Note that like items in multiple figures have like item numbers.

Figure 1:
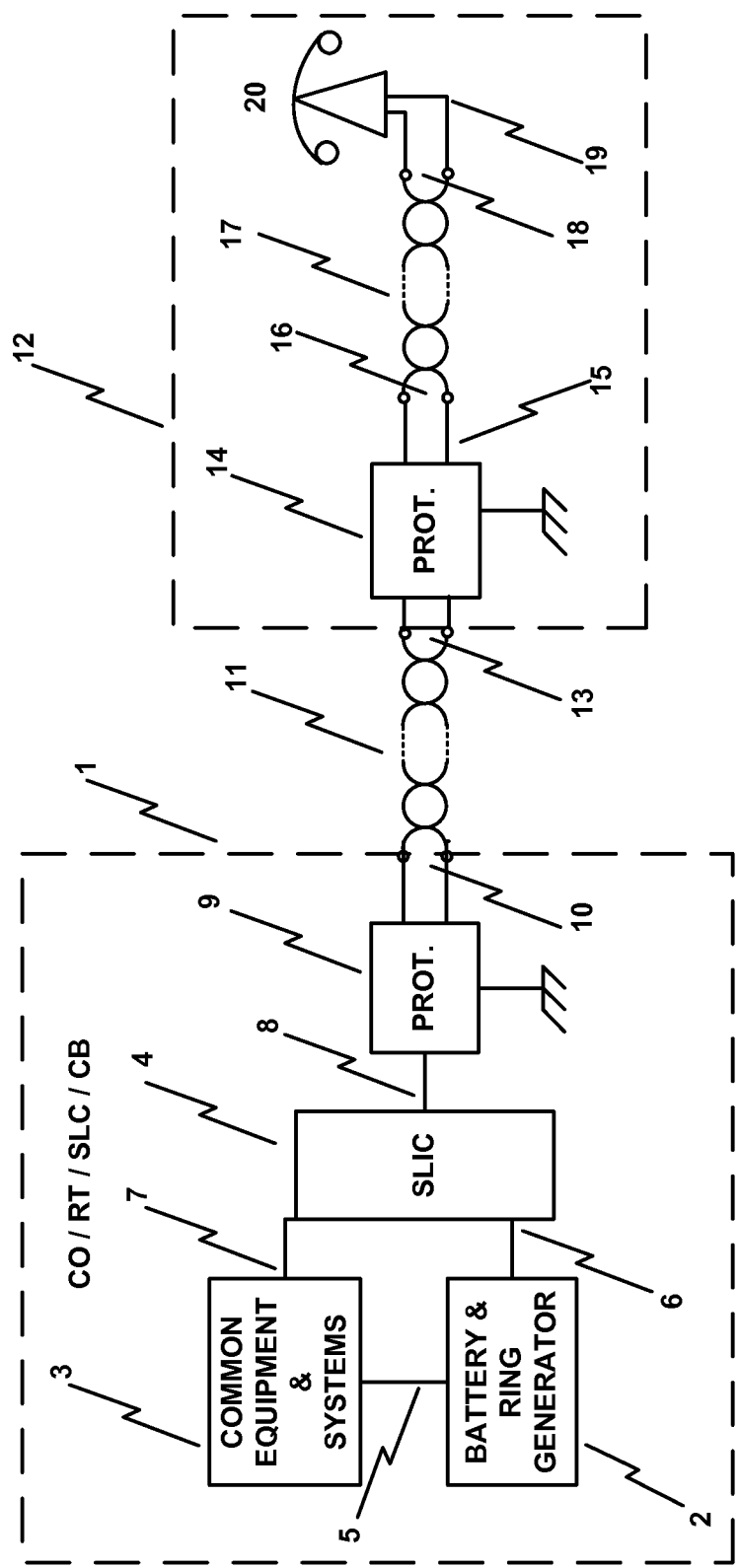
FIG. 1 is a schematic showing a typical POTS system for delivering "land line" service to a local telephone. It is labeled as "prior art" because it existed prior to the present invention.
Figure 2:
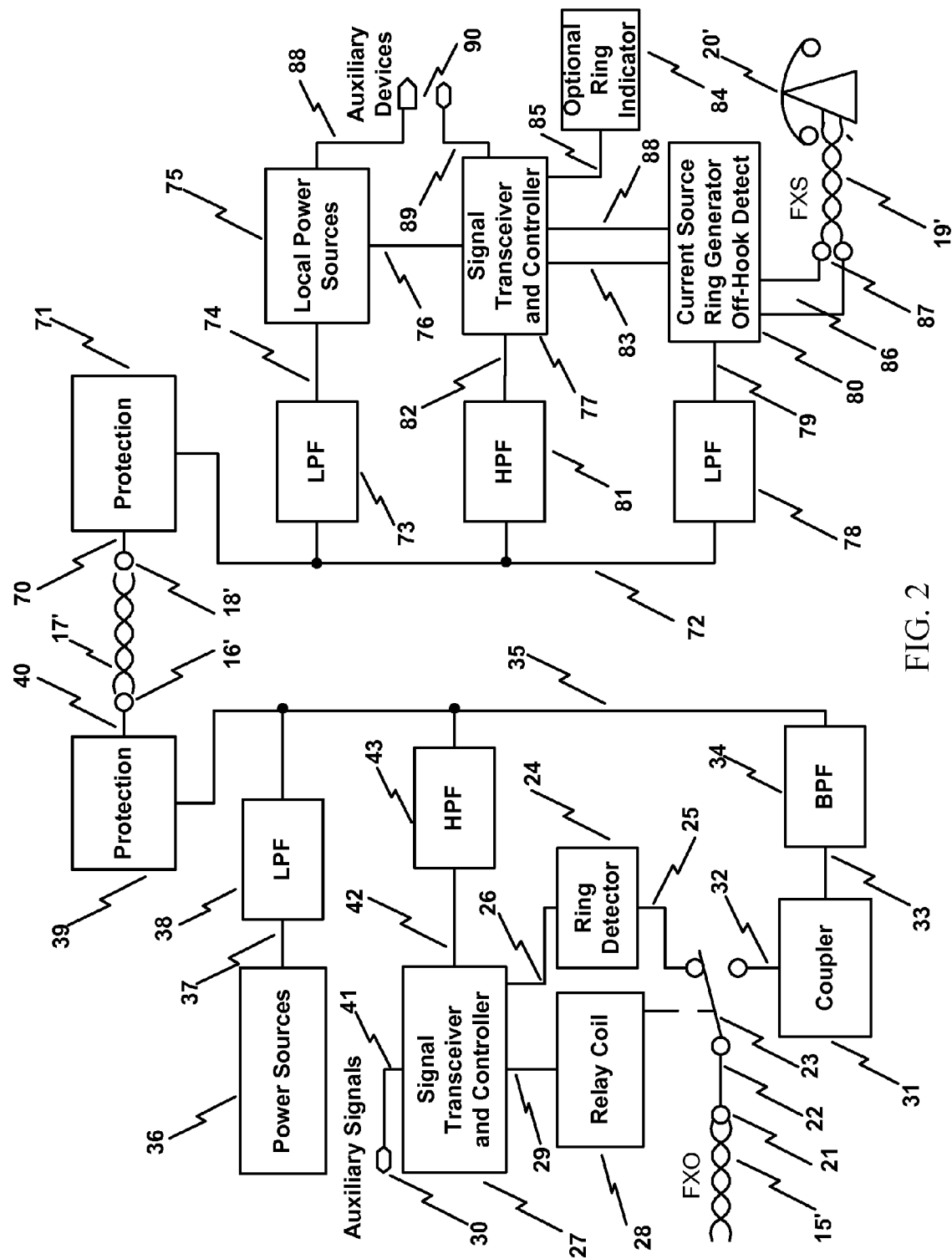
FIG. 2 is an overall schematic of an embodiment of the present invention showing how the major functional blocks are interconnected to provide the electrical, audio, and signaling terminations.

FIG. 1 is a simplified depiction of a traditional "plain old telephone system" ("POTS") telephone subscriber circuit including pertinent elements at a Central Office ("CO"), the "outside plant," and at the location of the end customer instrument, i.e., "local telephone" and any peripheral functions or devices. It is provided as context in that it represents: (a) how telephone current is provided to the local telephone in the absence of the present invention and (b) the electrical relationship of major on-premises components. FIG. 2 is a depiction of an embodiment of the invention which: (a) provides electrical, audio, and signaling termination for the subscriber location as seen by the traditional POTS network and (b) shows the arrangement of circuit elements which provide the additional power and functionality which will be then conveyed to the terminating equipment end of the complete system.

FIG. 1 depicts a very high level view of a subscriber telephone instrument 20, the "Serving Wire Center" 1 ("SWC") for a specific customer, the subscriber premises 12 where the telephone instrument 20 is located, the telephone line 11 connecting the two locations, and the customer premises inside wiring telephone line 17 that provides all but the final few inches or few feet of connectivity to telephone instrument 20. The serving wire center 1 is very commonly referred to as the "Central Office" ("CO") even though the specific equipment that pertains to the specific subscriber may actually be located at some point physically closer to the subscriber for example within a "Remote Terminal" ("RT"), a "Subscriber Loop Carrier" ("SLC") installation, or from a "Channel Bank" ("CB") which may be located within the subscribers or a nearby building or in a "Controlled Environment Vault" ("CEV") near the subscribers location. In most cases regarding the above examples, the equipment and functions mentioned may belong to the Local Exchange Carrier ("LEC"). For purposes of the present invention, the functionality of the SWC may also be provided by any other modern communications mechanism including, for example, an "Integrated Access Device" ("IAD"), a "residential gateway" ("RGW"), a "Private Branch Exchange" ("PBX"), an "Inmate Communications Control System" ("ICCS"), or any other system appropriate to the purpose as may be recognized by one skilled in communication arts. Further, such equipment may well not be owned or operated by the LEC but rather may belong to an entity associated with the physical premises or some unrelated third party. In that context, the following is a brief description of POTS features and items that provide context for the present invention.

The SWC requires a power source to run everything within its own confines but traditionally also provides the subscriber loop bias current to each customer such that the subscriber no longer has to provide their own individual battery system, as was the case prior to this practice being adopted as a standard practice. This core power source 2 comprises major elements such as AC mains powered battery chargers, optionally a backup generator in case of AC mains interruption, storage battery systems that provides uninterrupted power to operationally critical systems, including the loop bias current to the subscribers, and the "ring generators" ("RG").

The SWC may be thought of as having two very basic types of equipment to provide normal operations. The common equipment and systems 3 include all shared and non-subscriber specific equipment and functionality. The subscriber dedicated equipment including the "Subscriber Line Interface Circuit" ("SLIC") 4, current and voltage limiting, fusing protection, surge and lightening protection equipment 9, and the final subscriber "Tip and Ring" terminals 10, including the equipment, wiring, and functionality that is duplicated for and dedicated to individual subscribers. The various forms of equipment power for the common equipment is indicated by signal 5, while the battery and ringing voltages provided to each subscribers SLIC are indicated by signal 6. Those skilled in the art will recognize that among the functions within the SLIC subsystem is, as mentioned above, the limiting of the loop current to the subscriber terminals 10. Most often the SLIC is configured such that the current drawn from the SLIC will not exceed approximately 100 milliamperes (mA) if the subscriber pair is directly shorted together. Those skilled in the art will recognize that, primarily due to line resistance between terminals 10 and terminals 13, the actual off-hook loop current will normally be substantially less that the 100 mA limit and that the "Outside Plant" ("OP") is normally engineered to provide at least 18 mA loop current on the longest lines. Experience has shown that the most common range of off-hook loop currents is 22 mA to 35 mA. Signal 8 refers to the two-wire, typically "unshielded twisted pair" ("UTP"), associated with the physical wires carrying bias current, ringing voltage, signaling, and bi-directional voice frequencies between the SWC and the subscriber. Signal 7 refers to a set of physical and electrical signals which are often in significantly different formats as compared to those appearing on signal 8. Signal 7 includes many uni-directional signals to convey voice frequency signals, and control signals as are appropriate for the implementation of the SWC in question.

Signal 11 is simply a representation of all of the OP wiring and possible equipment used to implement the transportation of the signals available at the SWC terminals 10 to the subscriber location 12. The telephone service provider is normally responsible for appropriate protection to the subscribers internal wiring from the anticipated effects of lightning, high voltage transmission line induced voltages, accidental connection of undesired voltages, etc., from the OP wiring 11. Protection is indicated in the SWC by protection equipment 9 connected between the subscriber side "Tip and Ring" terminals 10 and the SWCs internal "Tip and Ring" signals 8, and indicated in the subscriber location elements 12 by protection equipment 14 connected between the SWC side "Tip and Ring" terminals 13 and the subscribers on-premises "Tip and Ring" signals 15.

The subscriber connection 19 to the local telephone instrument 20 may be the only apparent connection, as far as the subscriber is concerned, between the telephone service provider system and the telephone instrument 20. Those skilled in the art are aware that within the borders of the subscriber location 12 there exists a few physical elements that are normally transparent to the users of the telephone instrument 20. Elements pertinent to the present invention include the functional point of demarcation 16 ("DEMARC") between the LEC and customer premises equipment ("CPE") including perhaps a first distribution frame often referred to as the Main Distribution Frame ("MDF") which would be in near proximity to the DEMARC, inside wiring 17 ("IW"), which may include one or more additional intermediate distribution frames ("IDF"), leading eventually to some sort of jack, punch-down block, or other termination connection point indicated as point 18 in the figure, and finally, the connection 19 to the telephone instrument 20 itself. For reference purposes, those skilled in the art recognize that a conventional telephone instrument 20 embodies both audio or conversation, transceiver functionality, and also certain AC (alternating current) related capabilities such as customer alerting, Ringing, and certain DC (direct current) related functionalities of which the existence of loop current, or the on-hook or off-hook status of the telephone instrument, and the range of values of the amount of current when the instrument is in its off-hook state is relevant to the present invention. Those skilled in the art will understand that the foregoing is only a brief description of selected elements of a traditional telephone circuit and is not intended to be comprehensive, but rather to provide reference points for the description of the embodiments of the present invention that follows.

FIG. 2 provides a depiction of an arrangement of elements that describes an embodiment of the present invention.

FIG. 2 includes a depiction of an arrangement of elements that operating together may be referred to as the "Head End" ("HE") or "front end" functionality in one embodiment of the present invention. Subscriber Tip and Ring signal 15' is the same signal as its corresponding signal in FIG. 1. As previously stated, it is an object of the present invention to provide additional power and functionality and to make this additional power and functionality available at the local telephone location. This improved power can be delivered even if a traditional telephone instrument is not actually employed at that location or if the telephone is not employed for the traditional purpose of voice "telephone" communications. In other words, the increased power can be used to enable some communications device or one or more other instrument or capabilities employed with, or in lieu of, the local telephone. Communications devices examples include telephones, speaker phones, non-telephone, yet telephone-like instruments, such as a video phone or non-telephone-like devices that may optionally include telephone communications features such as a computer or microcontroller based display and user interface device primarily intended to access data or inmate related services. Some of these communications devices may traditionally be AC line powered devices.

FIG. 2 also includes a depiction of an arrangement of elements that operating together may be referred to as the "Tail End" ("TE") or "back end" functionality in one embodiment of the present invention. Local telephone instrument Tip and Ring signals 19' and the local telephone instrument 20' are the same elements and signals as their corresponding elements and signals in FIG. 1.

FIG. 2 also includes elements 16', 17', and 18' which are the same IW functionalities as those presented in FIG. 1.

It may now be recognized that FIG. 2 HE elements 21 thru 43 are, in an embodiment of the present invention, interposed between signal 15 and terminal 16 of FIG. 1 as indicated by their like elements 15' and 16' in FIG. 2. Likewise, it may now be recognized that the FIG. 2 TE elements 70 thru 90 are, in an embodiment of the present invention, interposed between terminal 18 and signal 19 of FIG. 1 as indicated by their like elements 18' and 19' in FIG. 2. As indicated in FIG. 2, telephone instrument 20' does not have an unimpeded sequence of direct electrical continuity between signals 15' and 19'.

Those skilled in the art may now follow the signals and mechanisms provided by the present invention as depicted in the embodiment presented in FIG. 2.

In an embodiment of the present invention, FIG. 2 indicates that a telephone instrument 20' is located at its original or local location and uses some "last inch" cable to provide connectivity of signal 19' to what it perceives as a SLIC or "Foreign Exchange Station" ("FXS") signal. This signal, in terms of DC voltage range, bias current, on-hook and off-hook control signaling, and optional alerting or ringing signals are functionally provided by a plurality of mechanisms now to be described.

In FIG. 1, the bias current, or "Talk Battery", is provided to telephone 20 from the distant source 2 without regard to the actual equipment, capabilities, purpose, or location of SWC, or alternative entity 1, keeping in mind that this bias current is typically around 25 milliamps at telephone 20. Likewise, the alerting or ringing voltage for telephone 20 is provided from the distant source 2, while the on-hook or off-hook status of telephone 20 is detected, from the SWCs point of view, by distant element 4. In FIG. 2 it can be appreciated by those skilled in the art that the SWC provided bias current may not be directly communicated through the elements depicted all the way to telephone 20. Those skilled in the art will also appreciate that SWC generated alerting, or ringing voltages, may not be directly communicated through the elements depicted all the way to telephone 20. Likewise, one skilled in the art would appreciate that the on-hook or off-hook status of 20 may not be directly communicated through the elements depicted all the way back to the SWC loop current detector. A more detailed examination of FIG. 2 will explain how the previously mentioned current and signal equivalents may be provided.

In the embodiment shown in FIG. 2, bias and signaling voltages and currents are communicated via signal 15' between the SWC function and the "Foreign Exchange Office" ("FXO") port 21 of the HE portion. These voltages and currents are then communicated by signal 22 to relay function 23 whose operation will be seen by one skilled in the art as being analogous to the hookswitch function in a traditional telephone instrument. However, a major difference between the traditional operation and that of the embodiment shown in FIG. 2 is that in the embodiment, the subscriber does not have physical or direct control of the hook switch function provided by relay function 23.

Relay function 23 is depicted in its on-hook state and thus voltages appearing on signal 15' will be communicated via relay function 23 and signals 22 and 25 to Ring Detector 24. Signal 26 is representative of the current ringing state of signal 15' and communicates this state information to Signal Transceiver and Controller 27 ("STC"). An alerting signal from the SWC functionality will thus be detected by Ring Detector 24 and forwarded via signal 26 to STC 27. Assume for the purposes of this description that this embodiment of the present invention is expected to forward the SWC alerting state to the local telephone 20'. This may not be the case in another embodiment such as in an embodiment intended for use with an inmate telephone control system where incoming calls would normally not be expected, nor would such calls normally be extended towards an inmate accessible telephone instrument. In the example embodiment, signal 26 does not directly cause an audible, visual, or other conventional ringing indication.

The STC may, depending upon the needs of a particular embodiment, encode a new signal 42 onto a higher frequency carrier where this carrier frequency is greater than the traditional telephony sampling frequency of 8,000 samples per second. Preferably, the carrier may be some multiple of 4 KHz. Those skilled in communications art will understand that should some of the energy of this carrier frequency reach the SWC voice frequency digital encoding device, e.g. a CODEC, then that energy, due to the effective under-sampling per Nyquist's theory, would result in an aliased or phantom frequency energy within the 0 to 4 KHz voice frequency range. This potential effect is minimized when the carrier frequency is a multiple of 4 KHz as the resulting aliased signal will be near zero Hz and thus be inaudible to persons on the related telephone call. To further attenuate any potential unwanted energy from the STC within the voice frequency communication frequencies, a "High Pass Filter" 43 ("HPF") may be provided. This is not intended to limit the carrier frequency to some multiple of 4 KHz, as HPF 43 may be configured to provide adequate isolation between the voice frequency range and the desired carrier frequency. For example, an HPF 43 required to adequately attenuate carrier frequency energy above 20 KHz may be implemented. Alternatively, it may be convenient to use two or more carrier frequencies where each carrier frequency is also a multiple of 4 KHz, or may have no special relationship to 4 KHz, so long as HPF 43 provides adequate isolation between the voice frequency range and the selected carrier frequencies. Moreover it may be convenient to use one or more carrier frequencies in each direction, i.e., one or more carrier frequencies from HE to TE (as described later), and the same or a different one or more carrier frequencies from TE to HE. The output of HPF 43 is coupled to a common bus 35 that provides for the combining of signals, which will be described below, onto a single wire pair so as to provide novel capabilities.

While the following will be more completely described, please assume that an appropriate off-hook representation signal, again encoded onto the high frequency carrier previously described, or encoded onto yet another useful carrier frequency arrangement, is sent from the TE system depicted in FIG. 2 and thus appears on the common signal bus 35 of FIG. 2. When the encoded signal presently being considered passes through HPF 43, it will appear to STC 27 on signal 42, which is a bidirectional signal, where STC 27 may receive the signal, decode the command, and in response to the command, send signal 29 to relay coil 28 causing relay contacts 23 to connect signal 15' to signal 32 and thus to coupler element 31.

Coupler 31 provides three principal functions: first, to provide DC loop termination toward the SWC; second, to couple traditional voice frequency energy in the range of approximately 300 Hz to 3500 Hz bi-directionally between signals 32 and 33; and third, to provide DC isolation between signals 32 and 33. This coupler may be either passive, if some small insertion loss is acceptable, or active if there is a requirement to compensate for, and thus minimize any voice frequency artifacts. Another function of coupler 31 is to, under abnormal conditions, attenuate the relatively high ringing voltages from passing through to signal 33 which is primarily intended to be limited to traditional voice frequency energy. Normally relay 23, 28 prevents ringing voltage from reaching coupler 31. To further ensure this is accomplished, a "Band Pass Filter" ("BPF") 34 may be provided prior to coupling signal 33 to the common signal bus 35.

As mentioned previously, coupler 31 provides DC loop current termination towards the SWC. Those skilled in the art will recognize that with this arrangement there is no bias power available to power either the HE STC 27 or the telephone instrument 20' that the subscriber would presumably use. Therefore, the embodiment of the present invention shown in FIG. 2 provides a novel arrangement to satisfy those needs, but also to provide new and additional capabilities that will become evident. A master power element 36, as depicted in FIG. 2, may be an AC line powered supply, a battery, perhaps some other DC power source, or a combination of these configured to supply a DC voltage to power signal 37 to an effect somewhat similar to the SWC battery function.

Those skilled in the art will understand that the power signal 37 appears very much like a large capacitor which would effectively short out or highly attenuate virtually any AC signals such as voice frequency or higher frequency signals, if those signals were to be connected directly to power signal 37. Those skilled in the art will recognize that the BORSCHT functions, and particularly the battery feed to the hybrid of a SWC SLIC function, is intended to prevent this non-DC shorting effect. In the embodiment shown in FIG. 2, the traditional BORSCHT functions are foregone and only a "Low Pass Filter" 38 ("LPF") is used to prevent non-DC signal attenuation and to provide a non-current limited DC bias to the signal passed from LPF 38 to common signal bus 35 to novel effect. Elements 36 and 38 together are provided to present a relatively low "equivalent series resistance" ("ESR") towards the signal passed from LPF 38 to common signal bus 35 at DC and a high ESR generally for AC signals including AC signals at voice frequencies and above. Although this arrangement may hint at those advantages later to be described, it also presents some potential problems. If signal 35 were to be directly connected to HE output terminals 16' and if the terminals 16' were shorted, there would exist the same sort of over currents that would exist if a SWC did not provide current limiting to its own subscriber circuits The protection fuses in traditional protection element 9 in FIG. 1 are chosen to protect against major faults such as inadvertent connections to AC mains (110/220, etc.) but are not intended to specifically limit the SWC loop current to 100 milliamps as that is accomplished by the battery feed resistors of the SLIC. In embodiments of the present invention, a useful current limit may be provided with resettable fuses or a current foldback circuit. Protection element 39 in FIG. 2 may also provide lightning protection similar to that provided by element 9 in FIG. 1.

Figure 3:
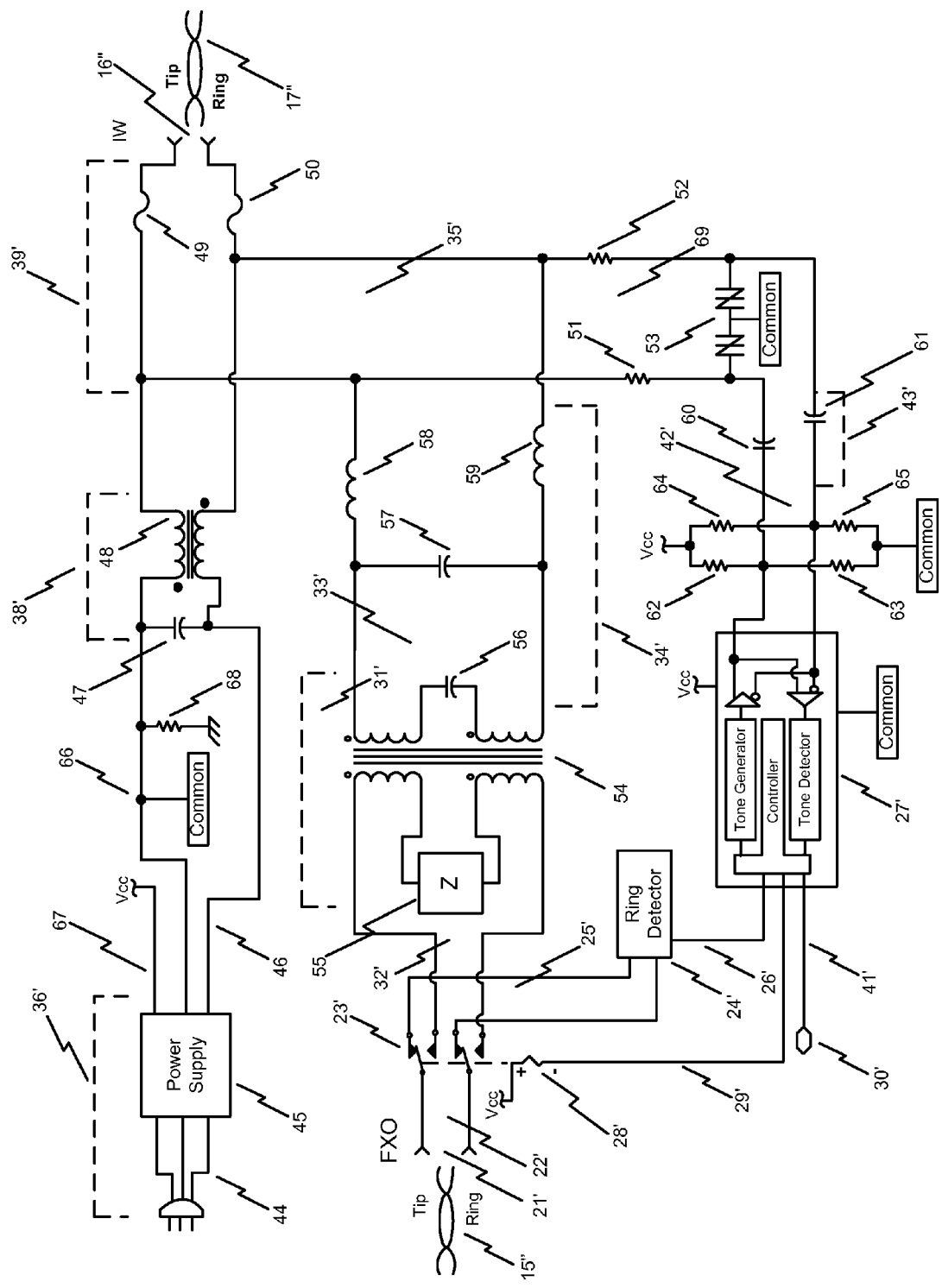
FIG. 3 is a circuit schematic showing in more detail an example implementation of one embodiment of the Head-End of the present invention.

FIG. 2 also depicts an arrangement of elements that operate together to form what may be referred to as the "Tail End" ("TE") or "back end" functionality of the present invention. IW telephone line 17' in the figure carries the higher DC current capability presented by the HE as previously described as well as voice frequency energies and the higher frequency carrier encoded bi-directional signals as previously discussed. The signals on IW telephone line 17', which may be considered a modified form of Tip and Ring signals, appear on the TE terminals 18' and may be connected to protection element 71. Protection element 71 would conveniently have many characteristics similar to those of protection element 39 including a low ESR throughout its design current range as well as lightning and induced voltage protection and excessive current limiting as its function would be most beneficial if IW telephone line 17' were either relatively long, perhaps thousands of feet, or if it traversed open distances between buildings where lightning or power lines may induce undesirable voltage or currents into it, or both. One skilled in the art will recognize that in many cases protection elements 71 or 39, or both, would not be necessary in a particular embodiment. For example, if power source 36 implementation includes the current foldback characteristic previously mentioned, then fuse elements 49, 50 of FIG. 3 are not required for short circuit protection purposes which would result in the overall ESR of the HE being reduced by the ESR due to these fuses. With this in mind, it may be seen that the DC voltage, voice and carrier frequency energies on IW telephone line 17' are coupled to common signal bus 72 which is functionally somewhat similar to common signal bus 35. The embodiment shown in FIG. 2 also contains element 73 which is a LPF with characteristics substantially similar to those of LPF 38. LPF 73 then couples primarily only the DC portion of the signal on common signal bus 72 to the input sides of local power source 75. Note that power source 75 may conveniently be implemented as one or more "switch mode power supplies" ("SMPS") depending upon the needs of the specific implementation. Power source 75 is provided to supply any local bias power such as to STC 77 and to provide some limited amount of power to an external device or system such that that external device or system does not require a local, generally AC mains derived, power source. If a specific implementation requires different voltages either for functions internal to the TE or for the TE circuitry and for an optional auxiliary device, then local power source 75 may be composed either of appropriate individual power conversion elements or a single conversion system with multiple outputs as would be appropriate for the implementation. In any case, it is appropriate to configure the local power source such that an overload condition presented to the auxiliary power signal 88 could be appropriately managed and yet would not interfere with any other TE operational capability.

Element 78 in FIG. 2 is a LPF whose upper frequency characteristics would normally match the similar characteristics of BPF 34. Element 78 is a LPF so that the DC component of the signal on common signal bus 72 may be utilized to provide bias current to a telephone instrument such as 20' should such be connected to telephony output terminals 87. Since the power source for the signal on common signal bus 72 derives from the low resistance source 36, 37 a local current limiting means is provided by a Constant Current Limiter ("CCL"), an element of 80. Per previously noted experience, the CCL may conveniently be configured to provide, for example, 22 to 30 mA to a telephone instrument 20' when in its off-hook configuration. Thus signal 79 contains: (1) DC voltage with its current limited only by the resistance of LPF 38, telephone line 17' and resistances within, and protection limits of optional elements 39 and 71; (2) the voice frequency energy path needed for telephone 20' while the CCL controls that loop current at signal 86 to its preconfigured value.

An Off-Hook Detector, an element of 80, is provided to sense when a telephone instrument 20' is in its off-hook configuration. The status of the on-hook or off-hook configuration is reflected by the state of signal 88 being presented to STC 77. STC 77 would encode this onto a signal sent towards the HE STC 27 in a manner similar to that described earlier for the ring detection signal being encoded and sent from STC 27 towards STC 77. Likewise, when STC 77 receives a signal from STC 27 interpreted as ringing from the SWC, STC 77 would activate signal 85 to enable an optional local ringer 84. Optionally, ringer control signal 83 may enable Ring Generator ("RG"), an element of 80, which may activate a conventional ringer device in telephone 20', should one exist. If an RG is not provided in a particular implementation, then the AC characteristics of signal 86 are the same as those of signal 79, else signal 86 has the additional capability of including the ringing voltage provided by the RG. Signal 86 is the TE local telephony signal, voltage, and current set presented to output terminals 87.

In a similar manner the off-hook encoded signal sent from STC 77 to STC 27 may now be recognized by STC 27 which would utilize signal 29 to activate relay coil 28 to energize relay contacts 23 to effectively connect coupler 31 towards the SWC or appropriate SWC-like equipment as an off-hook event.

It is now apparent that the above descriptions explain how the embodiment of the present invention shown in FIG. 2 may advantageously use the low ESR characteristic of the HE to provide an auxiliary power source at the TE location. First, the HE device may provide significantly more power to its output terminals 16' principally due to the low ESR of the HE design. Further, a telephone instrument 20' connected to the TE device will only use a relatively small portion of the current potentially available at the TE device input terminals 18'. The difference between the current, and thus power, available at TE input signal 70, and the actual power consumed by telephone instrument 20', is thus available to one or more power supplies such as power source 75. With the one or more local power supplies such as power source 75 being implemented with modern high efficiency SMPS designs, this additional power permits a new range of capabilities and features to be provided at a location normally considered limited to the availability of a simple telephone instrument without providing any new wiring or AC mains to the location.

Further, the expected functions of traditional ringing and off-hook signaling have been effectively preserved such that the SWC, or whatever provides that function, would not be materially affected by provisioning of these new capabilities.

Further, one skilled in the art may appreciate that the additional signaling capabilities afforded by the out-of-band signaling channels may permit either additional types of signals to be exchanged between the HE and TE locations, or more secure communication of sensitive signals previously exchanged as DTMF or other forms of in-band signaling, or both. One example of signals that may benefit from this additional security are credit card or personal account access codes.

As described in connection with FIG. 2, the carrier frequency or frequencies that are used to convey signaling information between the HE and TE portions of embodiment of the present invention are also related to the frequency discriminate filters identified as HPF's 43, 81 in FIG. 2. Alternatively, it is possible to use one or more carrier frequencies that fit below the normal telephony voice frequencies for example in the range of 5 Hz to 120 Hz as the carrier frequency or frequencies instead of, or in addition to, the higher frequencies previously described. In the case of such low frequencies carriers filters 43 and 81 would be configured as Band Pass Filters instead of High Pass Filters for those carriers. Because such low frequencies might be heard by the persons using the overall system for voice communications it may be necessary to include a Band Reject or Notch Filter along with the BPF 34 and LPF 78 functionality to reduce or eliminate objectionable artifacts related to such low frequency carriers. If both low and high frequency carriers are used within the same system each frequency range requires its own frequency discriminate filters of appropriate configuration.

A particularly useful choice for such a low frequency carrier is 60 Hz since CODECs associated with SLIC functions typically already contain band reject or notch filters to minimized anticipated 60 Hz hum coupled from AC mains carried on wires which may run parallel to telephone lines. This also applies to a carrier frequency of 120 Hz.

To appreciate the benefits of embodiments of the present invention it is helpful to consider the practical power normally delivered to a telephone instrument with the power that may be delivered to the same location by use of embodiments of the present invention.

Assume for these first examples that the Voltage source is −48 VDC.

Further, in the traditional POTS case, assume that the ESR of the SLIC is a fixed 480 Ohms. In a hypothetical case, please also assume that the telephone instrument was unconstrained and was able to choose any equivalent resistance for the sole purpose of maximizing the power it could use. Further, let us assume that the telephone instrument was located at zero feet from the SWC SLIC terminals such that the total line related resistance was 0 Ohms. In such a case, the telephone instrument would choose to match the source resistance of 480 Ohms and one-half of the source voltage would appear across the telephone instrument resulting in a loop current of 50 mA and 1.2 Watts being dissipated by the telephone instrument and another 1.2 Watts being dissipated in the ESR of the SLIC. Thus, the absolute maximum power that a traditional SLIC circuit can deliver to a traditional telephone instrument under these hypothetical ideal conditions is 1.2 Watts.

In another hypothetical case assume that the SLIC ESR was replaced by a constant current source of ideal compliance and configured to deliver 22 mA under all loop resistances and within the available source voltage. Again let us assume that the telephone instrument was located zero feet from the SWC SLIC terminals such that the line resistance was 0 Ohms. In such a case, the telephone instrument would choose to have a resistance which would place all of the available voltage across its own terminals. Since that voltage is 48 volts, the instrument would choose 2182 Ohms which would result in just less than 1.06 Watts being dissipated by the telephone. Similarly, if the constant current source was configured to supply 30 mA the chosen resistance would be 1600 Ohms and the power dissipated would be 1.44 Watts.

The real world will neither have zero length lines nor telephones that have only a requirement to maximize power dissipated. Real telephone lines are typically 24 AWG copper which exhibits a resistance of about 50 Ohms per thousand feet for a twisted pair.

Assume now again the traditional −48 VDC source and 480 Ohm ESR and that the line length were 1000 Ft but the telephone instrument was still free to ideally choose its ESR to maximize the power it dissipates. This results in a 530 Ohm phone with just less than 1.09 Watts being dissipated. At 4000 Ft the result would be a 680 Ohm phone with just under 850 milliwatts dissipation.

With a constant current source of 22 mA from the =48 VDC source and 1000 Ft of 24 AWG UTP, the phone would chose to have 2132 Ohms resistance with maximum power would be 1.03 Watts while at 4000 Ft the phone would chose 1982 Ohms resistance with a dissipation of less than 960 milliwatts. Similarly, for a 30 mA source, the 1000 Ft power would be less than 1.4 Watts and at 4000 Ft about 1.26 Watts with respective phone resistances of 1550 and 1400 Ohms.

It is instructive to compare an embodiment of the present invention to see what may be provided to the telephone instrument location from the same −48 VDC level and then estimate the power available for other purposes beyond that required by the telephone instrument itself.

Assuming that the ESR of the Head End of the embodiment is about 60 Ohms and then repeat the above calculations related to that configuration. If the line length were zero, and there were no current limiting at all, then the telephone instrument along with any additional circuitry desiring to use the excess power would choose an equivalent total resistance of 60 Ohms which would result in 9.6 Watts being available at the telephone instrument location. As the telephone itself requires only about 100 milliwatts to operate, almost 9.5 Watts would be available for the additional circuitry. But in the embodiment if we choose to describe the source current limiting fuses as being limited, in one example, at 100 mA, then the phone would choose to have 420 Ohms resistance and the maximum power available would be about 4.2 Watts leaving 4.1 Watts available for the additional circuitry.

One skilled in the art would appreciate the value of embodiments of the present invention even when the maximum current is limited to 100 mA and the additional advantage of choosing a somewhat higher maximum current limit. Likewise, if the source voltage was selected to be a voltage higher than 48 Volts, one can appreciate the yet higher power available for use by additional circuitry for otherwise identical line lengths or similar power over greater line lengths. Without listing all details as above, in embodiments, the present invention would provide the following approximate total power capability at various source voltages and telephone line lengths while retaining a 100 mA current limit. At 75 VDC Talk Battery: 6.4 Watts at 1000 Ft, 4.8 Watts at 4000 Ft, and 3.8 Watts at 6000 Ft. At 100 VDC Talk Battery: 8.9 Watts at 1000 Ft, 7.4 Watts at 4000 Ft, and 6.4 Watts at 6000 Ft. At 120 VDC Talk Battery: 10.9 Watts at 1000 Ft, 9.4 Watts at 4000 Ft, and 8.3 Watts at 6000 Ft. Considering the same voltages and telephone line lengths but limiting the loop current to less than 550 mA, and in most cases less than 400 mA is the actual current expected, then at 75 Volts the total power capability deliver to the Tail End would be 12.7, 5.3, and 3.8 Watts respectively. From 100 VDC one would expect to have 22.5, 9.5, and 6.8 Watts available respectively. Finally, from 120 VDC one would expect to have up to 32.4, 13.6, and 9.8 Watts available respectively. In all the above cases, the power is made available under ELV/SELV conditions.

It will be apparent to one skilled in the art that embodiments of the present invention satisfy the needs and objectives outlined in the background and enables considerable flexibility for novel functionalities at heretofore unpowered physical locations that have at least a single pair of telephone communications cable available.

V. EXAMPLE

Figure 4:
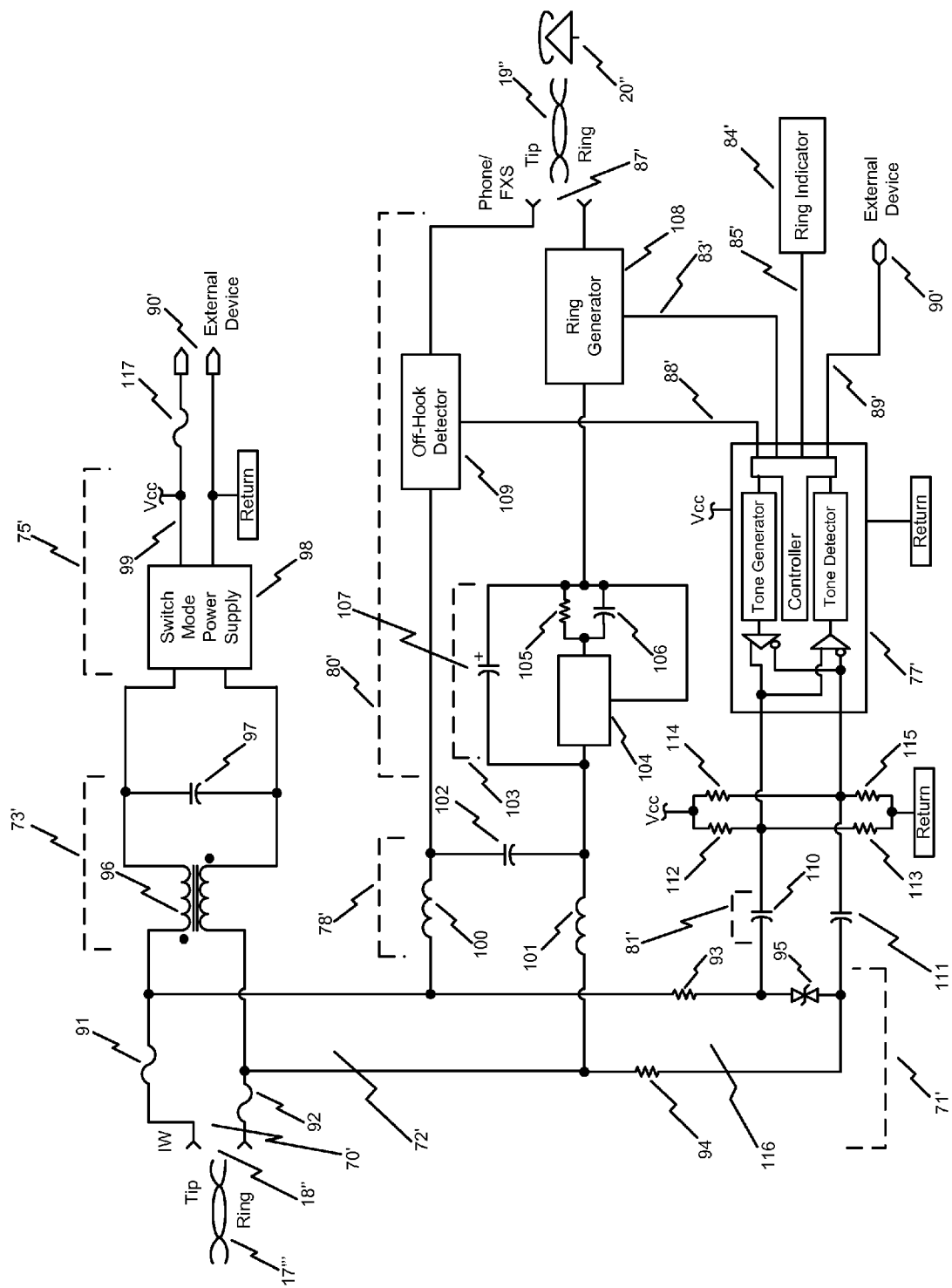
FIG. 4 is a circuit schematic showing in more detail an example implementation of one embodiment of the Tail-End of the present invention.

The componentry described with respect to FIG. 2 was embodied in "front end" and "back end" circuit boards shown in more detail in FIGS. 3 and 4 respectively. FIG. 3 and FIG. 4 merely illustrate one implementation of an embodiment of the present invention.

Referring first to FIG. 3, an example implementation of the HE portion of an embodiment of the invention. One skilled in the art will appreciate that in many cases several HE circuit blocks may be conveniently configured into a single assembly such that several TE locations might be served from a single HE location. While that was the case for the physical HE devices assembled, it is also convenient to consider a HE description as if it were a stand alone device as we shall do here.

Power source 36' is provided both for the "Talk Battery" ("TB") and for the bias requirements of the signaling and control electronics. In the example construction, the TB selected was a traditional −48 VDC obtained from a custom power supply. A suitable commercially available isolated AC input, DC output power supply is a VPS-25-48 available from CUI Inc of Tualatin, Oreg. Likewise, the bias voltage in the example construction was obtained from the custom power supply. A suitable commercially available isolated DC-DC power supply is a VWRBS1-D48-S5-SIP available from CUI Inc of Tualatin, Oreg. In this case, the TB supply also powers the bias supply. It is convenient to connect the outputs of these separate DC power supplies such that the overall result provides an SELV configuration along with a static drain resistor to earth ground. Referring now to FIG. 3, this arrangement is indicated by the AC line input cable 44 providing mains power to the isolated output 48 VDC power supply, a portion of 45. The traditional polarity for the TB is obtained by designating the more positive output terminal of the 48 VDC supply as "common" signal 66 while the more negative terminal provides TB signal 46. Rather than connecting the "common" terminal directly to earth ground as is normal practice in SWCs and similar equipment, the implementation provides a static charge bleed resistor 68 so that the resulting TIP and RING voltages may cover the International Electrotechnical Commission ("IEC") Extra Low Voltage ("ELV") range and retain a Safety Extra Low Voltage ("SELV") rating as contact with either TIP or RING terminal or electrically conductive point does not have a direct path through earth ground back to source 45. A suitable value for resistor 68 would be in the range of 100K Ohms to 1 Meg Ohm. A suitable surface mount device ("SMD") for this resistor is Vishay CRCW1206510KJNEA. As previously mentioned, the bias power supply, a portion of power supply 45, may conveniently be powered by the TB voltage source so that if a physical battery would be connected from 46 to 66, and a suitable isolated battery charger were to be used in place of the suggested precision voltage source described above, then all operating functions remain active in the event of an AC power loss. It is convenient to connect the more negative output terminal of the bias supply to "common" signal 66 and the more positive output terminal of the bias supply to "Vcc" signal 67.

Item 38', Low Pass Filter, serves to permit the passing of DC voltage and current from signal 46, 66 onto signal 35'. More specifically, this LPF serves to protect the AC electrical signals existing on signal 35' from the shunting effect of the low capacitive reactance of capacitor 47 and that of the Talk Battery power source portion of 45. Thus LPF 38' provides significant reactance at voice and signaling frequencies while providing a low LSR in series from signal 46, 66 to signal 35'. In the implementation this is accomplished by the use of a split inductor where half of the windings are in series with each the physical electrical conductors making up signals 46, 66 and 35'. These winding are connected, or phased, such that the two inductances act in concert like a single total inductance with capacitor 47 appearing across the apparent center of the inductors halves. An advantage of this split inductance arrangement is that while there is no true low resistance "ground" reference point as there would be in a traditional SWC, inductor 48 and capacitor 47 in concert provide excellent voice and high frequency isolation between multiple channels of a multi-HE configuration. A suitable SMD capacitor for 47 is 220 mu.F, 100V part number EMVY101GDA221MMH0S available from United Chemi-Con of Rosemont, Ill. A suitable inductor would have significant inductance and low DC resistance for each winding. As a suitable inductor was not commercially available, a custom inductor was designed and constructed on a small physical sized core and bobbin. The inductance of each winding was about 2.5 H with a DC resistance of less than 12 Ohms. The custom inductor was given part number 11-5415A available from Tranex of Colorado Springs, Colo.

Items 39', Protection Circuit, must take into account the low ESR nature of the main power source of the implementation. The primary function of this protection circuit is to limit current into or out of either terminal of the output conductor pair to a value that will protect the above main power source should the output conductors be shorted together, to ground, or to some unintended external power source. For the purposes of the example implementation, the short circuit current limit was selected to be about 100 mA. Appropriate devices for this purpose are resettable fuses 49 and 50 so that service may be automatically restored following an event causing the fuses to open in order to protect the system. Suitable resettable fuses for this purpose are Raychem (TYCO) part number TS250-130-RA available from TYCO Industries of Menlo Park, Calif. If the TB supply of power source 36' implementation includes the current foldback characteristic previously mentioned, then fuse elements 49, 50 are not required for short circuit protection purposes.

Contact from an inadvertent source to either TIP or RING must be accommodated safely and the most likely such source may have a voltage as high as 200 V peak such as from a 110 VAC hot lead. Due to the ground isolation provided by the implementation, such a voltage has only one return path back to its own ground reference that being through resistor 68. With the example 510K Ohms and −48 VDC TB values, the maximum current due to a 110 VAC hot lead touching the TIP lead somewhere would be less than 400 microamps or less than 500 microamps if touching the RING lead.

As any fuse, including those utilized in this example, requires a finite amount of time to react to an over-current condition additional protection may be warranted to protect the system from the effects of very brief events such as from voltages induced by nearby lightning strikes. If an implementation is concerned about the possibility of such induced voltages, then additional protection in the form of automatically resettable overvoltage clamp 53 is prudent. These devices typically present no effects upon the circuit until a high voltage appears on one or both of the output conductors. The devices then quickly transition to a low resistance state shunting the abnormal voltage to an appropriate reference point. As these devices typically and intentionally have quite low on-state forward voltages some small resistance 51, 52 in series with each terminal will tend to limit the inrush current. These resistors should be closely matched so as to minimize longitudinal balance errors and should be able to dissipate the small but finite amount of power they would likely experience during a fault condition. An appropriate value for these resistors is 10 Ohms, 1%, and 0.5 Watt rated. Suitable SMD resistors for this purpose are Dale (Vishay) part number CRCW201010R0FKEF available from Vishay Intertechnology of Malvern, Pa. If the induced voltage persists long enough the combination of voltage clamp 53 and series resistors 51, 52 may give the resettable fuses 49, 50 time to open as well. A suitable active voltage clamp is Littlefuse part number P1101CA2L available from Littelfuse of Des Plaines, Ill.

Item 21', Connector, is most often an industry standard telephony connector. A single Tip and Ring pair would thus typically use an RJ-11 style jack while a 24 channel (24 Tip and Ring pairs) would thus typically use a 25 pair ribbon connector. A suitable SMD device for a single channel connector is Molex part number 085513-5014 available from Molex Corporation of Lisle, Ill. A suitable insulation displacement device for 24 channels is AMP (TYCO) part number 554090-1 available from TYCO Industries of Menlo Park, Calif.

Item 23', 28', Relay, should meet typical telephony relay requirements and use as little operating power as practicable. This relay is most commonly a DPDT (2 Form C) type with a low power magnetically biased coil. The coil voltage rating should be compatible with the electrical drive available from the controller, Item 27'. If the controller is configured to operate from a 5 VDC bias voltage, then a suitable relay is NAIS (Panasonic) part number TXS2SA-4.5V available from Avnet Electronics of Phoenix, Ariz.

Item 24', Ring Detector, may be a circuit commonly comprised of an optocoupler of the 'AC' input variety in combination with a capacitor to couple the ringing voltage to the optocoupler input LEDs while blocking any DC current through the optocoupler LED and a resistor in parallel with the optocoupler LEDs such that in combination with the reactance of the capacitor at the ringing frequency ensures that a real ringing voltage is present before the transistor output of the optocoupler is activated. A suitable optocoupler is NEC part number PC2915-1-F3 which exhibits a nominal LED forward voltage drop of 1.1 V and is available from California Eastern Laboratories of Santa Clara, Calif. An appropriate value for the shunting resistor is 10K Ohms and may be a SMD 1/16 W due to the voltage limiting action of the optocoupler LEDs. A suitable SMD resistor is Yageo part number RC0805J-0710KL available from Yageo USA of San Jose, Calif. To ensure ringing voltage detection down to 60 Vrms the capacitor should be at least 270 nF and 250 V. A suitable SMD capacitor is Panasonic part number ECW-U2274KCV available from Digikey of Thief River Falls, Minn. A suitable output transistor pull up resistor may have a value of 10K Ohms. A suitable SMD resistor is Yageo part number RC0805J-0710KL available from Yageo USA of San Jose, Calif.

Items 27', Signal Transceiver and Controller, is a circuit comprised of a programmable microcontroller containing digital logic and analog device elements in addition to a programmable controller, random access memory for short term memory uses and programmable flash memory for program, configuration and operational settings. STC 27' is provided with resistors 62-65 to bias input signals for analog functions within the working limits of the microcontroller device. An appropriate microcontroller is Cypress Semiconductor part number CY8C27443-24PVXI available from Cypress Semiconductor of San Jose, Calif. Configuration and programming tools are provided by Cypress Semiconductor for this series of microcontrollers. Appropriate SMD resistors are Yageo part number RC0805J-0710KL available from Digikey of Thief River Falls, Minn.

Item 31', Coupler, provides several functions including DC termination of the SWC loop current, DC voltage isolation between the SWC provided voltage and loop current, and bidirectional voice frequency coupling of audio signal energy between the SWC and the internal system side of the coupler element. The coupling element would ideally cause no insertion loss into this last function. However, in many applications the small insertion loss due to the use of a quality transformer is justifiable as compared to the cost and complexity of a lossless bidirectional coupling mechanism such as a transformer, or transformers, along with amplifiers and likely hybrid circuitry used to compensate for the inherent transformer losses while preventing self oscillation. If the SWC function is actually provided by an IAD or channel bank arrangement, it is likely possible to adjust these units to externally compensate for the small inherent insertion loss of a single transformer design. The example implementation implements the coupler element based upon a single transformer design where in the transformer 54 is implemented as a 600:600 Ohm split primary and split secondary design. This transformer, as implemented in the present example, must operate satisfactorily while sustaining the net DC bias current of the SWC loop current termination. A suitable transformer was not found to be generally available from commercial sources. Thus custom transformers were constructed to meet these criteria. The custom transformer was given part number 17-7183 available from Tranex of Colorado Springs, Colo. The center terminals of each side of this transformer are bypassed for voice frequency coupling purposes by 2.2 .mu.F, 100 Volt, film capacitors. It should be noted that the voice frequency coupling (DC blocking) capacitor 56 on the secondary side of the transformer works in concert with the components of item 34' to provide the band pass nature of item 41'. Suitable SMD capacitors for this purpose are Arcotronics part number LDEEF4220JB0N00 available from Kemet Corporation of Simpsonville, S.C. The side of the transformer associated with DC termination of the SWC loop, referred to as the primary side of the transformer, also requires a resistor or resistors in parallel with the afore mentioned capacitor to provide DC termination of the SWC current loop when relay 23' is in the off hook state. The SWC termination impedance "Z" 55 may be implemented by a complex impedance. In many cases however, especially when the effective length of 15" is relatively short, simple DC resistance to terminate the current loop of the SWC and a parallel capacitance to minimize loss of AC coupling through the transformer is functionally effective. This resistance must be low enough to guarantee off hook detection by the SWC at maximum loop 15" length while being high enough to limit the current in the primary of the coupling transformer according to the DC current limitation of the transformer design when loop 15" electrical length is short. The present example chose to use six 100 Ohm, 0.25 Watt SMD resistors in series for a total of 600 Ohms, 1.5 Watts. Suitable SMD resistors are Yageo part number RC1206FR-07100RL available from Yageo USA of San Jose, Calif.

Item 34', Band Pass Filter, serves to pass voice frequencies bi-directionally between signals 22' and 35' via coupler 31' when relay contacts 23' are in an off-hook state while simultaneously blocking DC current from passing through the secondary of transformer 54 of coupler 31'. The DC blocking, or high pass component of this band pass filter is conveniently provided by the 2.2 µF capacitor 56 within coupler 31' circuit previously described.

BPF 34' frequency characteristics are implemented in the present example by a pair of small inductors 58, 59 placed in series with the electrical conductors comprising the signals 33' and 35' in FIG. 3, along with an appropriate corresponding capacitor 57 across the electrical conductors of signal 33' in FIG. 2. For the prototype circuits it was determined that the most advantageous values of these components are 18 mH for inductors 58, 59 and 68 nF, 100V, 5% film for capacitor 57. Suitable inductors are Coilcraft part number RFB0810-183L available from Coilcraft of Cary, Ill. A suitable SMD capacitor is Panasonic part number ECW-U1683JC9 available from Digikey of Thief River Falls, Minn.

Item 43', High Pass Filter, serves to effectively pass the high frequency carrier frequencies bi-directionally between signals 42' and 35' of FIG. 3 while blocking DC voltages and any potential interference from voice frequencies appearing on signal 35'.

HPF 43' is implemented in the present example by a pair of small capacitors 60, 61 connected in series with the electrical conductors comprising the signals 69, which is substantially similar to signal 35', and 42 in FIG. 3. For the prototype circuit it was found that the most advantageous value is 330 nF, 100V, 10% film for capacitors 60, 61. Suitable SMD capacitors are Panasonic part number ECW-U1C334KC9 available from Digikey of Thief River Falls, Minn.

Connector 16" is most often an industry standard telephony connector. A single Tip and Ring pair would thus typically use an RJ-11 style jack while a 24 channel (24 Tip and Ring pairs) would thus typically use a 25 pair ribbon connector. A suitable SMD device for a single channel connector is Molex part number 085513-5014 available from Molex Corporation of Lisle, Ill. A suitable insulation displacement device for 24 channels is AMP (TYCO) part number 554090-1 available from TYCO Industries of Menlo Park, Calif.

Although connector 30' may be defined by a specific application, in order to provide for signals 41', a common connector that may be easily configured to a suitable size is a right angle header such as AMP 4-103801-0 available from TYCO Industries of Menlo Park, Calif.

Referring now to FIG. 4, an example implementation of the TE portion of an embodiment of the invention. One skilled in the art will appreciate that in many cases a single TE circuit block may be associated with a single telephone instrument 20" location. However, it may also be convenient to configure two or more TE circuit blocks within a single assembly such as may be useful in a multi-user kiosk application.

Further, one skilled in the art may appreciate an arrangement where two or more TE circuits blocks may connect via one or more IW telephone line 17'" pair to a single HE circuit block so long as the audio frequency channels, which would effectively be in parallel, are either not utilized or that this parallel operation is beneficial, or at least not detrimental, to the end application and that the signaling encoding is such that the presumed, but optional, external devices connected to their respective signaling connectors 90' in FIG. 4 may beneficially utilize the common HE external signal 41 and connector 30 of FIG. 2.

Further one skilled in the art may appreciate that with an appropriate configuration of signals 89 and an appropriate one or more connector 90 of FIG. 2 multiple external devices may conveniently share the power and signaling capabilities afforded by the present implementation. One example of such an implementation is the beneficial operation of two or more biometric or other identification equipment associated with a single telephone 20' location. In embodiments, identification equipment may include a biometric device, a barcode scanner, a magnetic strip reader, a radio frequency identification tag reader, a camera, or a microphone. Examples of biometric devices that may be implemented at the location of telephone equipment 20' include but are not limited to a fingerprint reader, an iris scanner, a retina scanner, and a palm scanner.

Connector 18" is most often an industry standard telephony connector. A single Tip and Ring pair would thus typically use an RJ-11 style jack. A suitable SMD device for a single channel connector is Molex part number 085513-5014 available from Molex Corporation of Lisle, Ill.

Optional item 71', Protection Circuit, must take into account the low ESR nature of the main power source of the implementation. The primary function of this protection circuit is to limit current through the terminals of the input conductor pair 70' to a value that will protect the TE circuitry should some unintended external power source be connected across terminals 18" or the conductors of IW 17'". If particular implementation and installation conditions preclude such an event, fuse elements 91, 92 may be omitted. For the purposes of the example implementation, the current limit was selected to be about 100 mA. Appropriate devices for this purpose are resettable fuses 91 and 92 so that service may be automatically restored following an event causing the fuses to open in order to protect the system. Suitable resettable fuses for this purpose are Raychem (TYCO) part number TS250-130-RA available from TYCO Industries of Menlo Park, Calif.

Contact from an inadvertent source to either TIP or RING conductors of IW 17" must be accommodated safely and the most likely such source may be from a voltage as high as 200 V peak such as from a 110 VAC hot lead. Due to the ground isolation provided by the present implementation such a voltage has no return path to earth associated with the TE.

As any fuse, including those utilized in this example, requires a finite amount of time to react to an over-current condition, additional protection may be warranted to protect the system from the effects of very brief events such as from voltages induced by nearby lightning strikes. If an implementation is concerned about the possibility of such induced voltages then optional additional protection in the form of automatically resettable overvoltage clamp 95 is prudent. These devices typically present no effect upon the circuit until a high voltage appears across the input terminals 18". The devices then quickly transition to a low resistance state shunting the abnormal voltage to an appropriate reference point. As these devices typically and intentionally have quite low on-state forward voltages some small resistance 93, 94 in series with each terminal will tend to limit the inrush current. These optional resistors should be closely matched so as to minimize longitudinal balance errors and should be able to dissipate the small but finite amount of power they would likely experience during a fault condition. An appropriate value for these resistors is 10 Ohms, 1%, and 0.5 Watt rated. Suitable SMD resistors for this purpose are Dale (Vishay) part number CRCW201010R0FKEF available from Vishay Intertechnology of Malvern, Pa. If the induced voltage persists long enough the combination of voltage clamp 95 and series resistors 93, 94 may give the resettable fuses 91, 92 time to open as well. A suitable active voltage clamp for this example circuit would have a standoff voltage of 70 Volts ensuring a breakdown voltage no higher than 90 Volts. A suitable SMD device for this purpose is Vishay part number SMAJ70A available from Vishay Intertechnology of Malvern, Pa. If an implementation and installation is not concerned about inadvertent differential voltages appearing across IW 17" conductors then items 93, 94, 95, and perhaps 91 and 92 may be omitted.

Items 73', Low Pass Filter, similarly serves to permit the passing of DC voltages and current from signal 72' onto signal 74'. More specifically, this LPF serves to protect the AC electrical signals existing on signal 72' from the shunting effect of the low capacitive reactance of the input circuitry of power sources 75'. Thus LPF 73' provides significant reactance at voice and signaling frequencies while providing a low ESR in series from signal 72' to signal 74'. In the implementation this is accomplished by the use of a split inductor 96 where half of the windings are in series with each the physical electrical conductors making up signals 72' and 74'. These windings are connected, or phased, such that the two inductances act in concert like a single total inductance with the input capacitor 97, along with any additional input capacitance of power sources 75', appearing across the apparent center of the inductors halves. A suitable inductor would have significant inductance and low DC resistance for each winding. As a suitable inductor was not commercially available, a custom inductor was designed and constructed on a small physical sized core and bobbin. The inductance of each winding was about 2.5 H with a DC resistance of less than 12 Ohms. The custom inductor was given part number 11-5415A available from Tranex of Colorado Springs, Colo. A suitable SMD capacitor for 97 is 220 .mu.F, 100V part number EMVY101GDA221MMH0S available from Untied Chemi-Con of Rosemont, Ill.

LPF items 38' of FIG. 3 and 73' of FIG. 4 thus have basically the same criteria of providing low resistance to DC signals while providing significant reactance to voice and signaling frequencies. For items 48 of FIG. 3 and 96 of FIG. 4, an inductor with a resistance in the 10 to 20 Ohm range and an inductance of around one half Henry per winding has been found to be satisfactory for this purpose.

Local Power Source 75' must operate from the available DC input voltage and provide a low voltage bias source, typically 5.0 VDC or 3.3 VDC, but may be some other voltage or set of voltages as may be convenient, for the electronic components and circuitry required to implement the active functions of the implementation. As such, this voltage/power converter must be able to operate from the voltage provided by item 42 of FIG. 2 which may be a nominal −48 VDC. One skilled in the art will recognize that even if item 42 of FIG. 2 is a nominal −48 VDC, particularly if 42 of FIG. 2 is implemented as a storage battery and battery charger, this source voltage may vary over a range of perhaps 40 VDC to near 60 VDC. Due to the resistive losses inherent in Item 17", the input voltage seen by Item 75' may be substantially lower than even this, perhaps as low as 10 to 20 VDC. Therefore, 75' must be of as high an efficiency as practicable and in the implementation is implemented as a Buck type switch mode power controller. Due to the potentially wide range of input voltages seen by this controller, the controller must be able to operate over this same input range of voltages, such as an example of 10 to 60 VDC. It is further desirable for this controller to require a minimum of 'external to the controller' components such as external switching transistors. A suitable controller for this purpose is National Semiconductor part number LM5574MT available from National Semiconductor of Santa Clara, Calif. A suitable inductor for use with this controller in this application is a dual winding inductor connected such that one winding is utilized as the buck inductor as described in National Semiconductor application notes for this controller while the second winding is configured to provide the operating bias voltage for the controller. A suitable SMD inductor for this purpose is Coiltronics (Cooper Bussmann) part number DRQ74-151-R available from Cooper Bussmann of St. Louis, Mo. One skilled in the art will appreciate that if two or more separate voltages are required for such bias supplies, then either separate, parallel input, SMPSs may be used, or generally it would be more practical to set the SMPS to deliver the highest such voltage and then use small linear regulators to drop this voltage to the remaining lower bias voltages.

Low Pass Filter 78' serves to pass voice frequencies bi-directionally between signal 72' and elements of 80'. In contrast with BPF 34' in FIG. 3, LPF 78' must pass DC current as this current is required to power a telephone or similar function instrument 20" if such an instrument is used by the application.

Items 34' in FIG. 3 and 78' in FIG. 4 otherwise have similar frequency characteristics and are implemented in the present example by the same components as those described for BPF 34' in FIG. 3. For reference, suitable inductors are Coilcraft part number RFB0810-183L available from Coilcraft of Cary, Ill. A suitable SMD capacitor is Panasonic part number ECW-U1683JC9 available from Digikey of Thief River Falls, Minn.

Item 80', Constant Current Limiter, Ring Generator, and Off-Hook Detector, item 80 in FIG. 2, is shown in more detail being depicted as separate functions Constant Current Limiter 103, Ring Generator 108, and Off-Hook Detector 109.

Constant Current Limiter 103 is provided in the implementation by the application of a voltage regulator of sufficient power dissipation and input voltage capability configured as a constant current source including a small resistor to set the desired current, an appropriate capacitor as required by the regulator for stability, and a larger audio frequency bypass capacitor in parallel with the resulting circuit to provide an electrically noise free current source. A suitable linear regulator for this purpose is National Semiconductor LM337T available from National Semiconductor of Santa Clara, Calif. A resistor of 56.2 Ohms, 1%, is used in the implementation to configure this regulator as a 22 mA current source (no current will flow if item 20" is not connected and on hook). A suitable SMD resistor is Yageo part number RC0805FR-0756R2L available from Yageo USA of San Jose, Calif. A suitable SMD capacitor for stability is Kemet part number T491A105M016AT available from Kemet Corporation of Simpsonville, S.C. A suitable SMD capacitor for electrical noise suppression is Chemi-Con part number EMVE101ADA330MJA0G available from United Chemi-Con of Rosemont, Ill. If the source voltage made available from 36 of FIG. 2 is greater than 48 volts, an LM337 could be forced to dissipate more power than that for which it is specified and this function would be replaced by, for example, a SMPS regulator configured to provide the same resulting current.

Item 84', Option Ring Indicator, if needed by the intended application, may by implemented by the use of a pair complementary outputs of item 77' to drive a ceramic resonator at the resonators design frequency. A suitable ceramic resonator is Kyocera part number KBS-20DB-2P-0, available from Kyocera International of San Diego, Calif., which is designed to operate at 2 KHz and up to 10 V peak to peak. In this case, the controller would provide both the driving pattern and voltage to produce an appropriate audible signal.

Ring Generator 108, if needed by the intended application, may be implemented by a custom circuit such as an appropriate circuit based upon use of Unitrode part number UCC3752 available from Texas Instruments of Dallas, Tex. or based upon use of Supertex part number HV430 available from Supertex of Sunnyvale, Calif. It may be convenient to simply use an off the shelf ring generator module for this function. A suitable module is PowerDsine part number PCR-SIN06V48F00 available from Microsemi of Irvine, Calif.

Off-Hook Detector 109 may be a circuit comprised of an optocoupler in combination with a resistor in parallel with the optocoupler LED such that the combination requires at least 5 mA, by standard practice, before the LED causes the optocoupler output transistor to activate. The LED, with parallel resistor, is connected in series with one lead of the telephone output connector observing the required polarity of the LED. A suitable SMD optocoupler is NEC part number PC2913-1-F3 which exhibits a nominal LED forward voltage drop of 1.1 V available from California Eastern Laboratories of Santa Clara, Calif. An appropriate value for the shunting resistor for use with this optocoupler is 160 Ohms and may be a SMD ⅛ W device due to the voltage limiting action of the optocoupler LEDs along with the 22 mA current limit provided in the implementation. A suitable SMD resistor is Yageo part number RC0805FR-07160RL available from Yageo USA of San Jose, Calif. A suitable output transistor pull up resistor may have a value of 10K Ohms. A suitable SMD resistor is Yageo part number RC0805J-0710KL available from Yageo USA of San Jose, Calif. If longitudinal balance is particularly critical in a particular application, then it may be advisable to use two optocouplers as above, along with each optocoupler LED shunt resistor, where one optocoupler is in series with each of the telephone output leads observing LED polarity requirements. These optocoupler output transistors may be connected in parallel in this case and share a single pull up resistor and signal connection to the associated controller 77'.

Connector 87' may be an industry standard telephony connector. A single Tip and Ring pair would thus typically use an RJ-11 style jack. A suitable SMD device for a single channel connector is Molex part number 085513-5014 available from Molex Corporation of Lisle, Ill. However, particularly if the device used as instrument 20" is something other than a standard telephone, some other type of connector may be more suitable.

High Pass Filter 81' is functionally the same as HPF 42' in FIG. 3 and thus may utilize the same components. For reference, suitable SMD capacitors are Panasonic part number ECW-U1C334KC9 available from Digikey of Thief River Falls, Minn.

STC 77' is functionally similar to and uses the same or a microcontroller similar to that suggested for STC 27' in FIG. 3. STC 77' is provided with resistors 112-115 to bias input signals for analog functions within the working limits of the microcontroller device. For reference, an appropriate microcontroller is Cypress Semiconductor part number CY8C27443-24PVXI available from Cypress Semiconductor of San Jose, Calif. Configuration and programming tools are provided by Cypress Semiconductor for this series of microcontrollers. Appropriate SMD resistors are Yageo part number RC0805J-0710KL available from Digikey of Thief River Falls, Minn.

Item 90', Connector, would typically be application dependent so as to provide a physical connector most convenient for the intended installation or user. As the implementation anticipates that the auxiliary output voltage to be within SELV limits, and even commonly to be less than 15 VDC at the power connector, if separate from any auxiliary signal termination, may be of the common pin and sleeve type. A suitable connector is CUI part number PJ-102A available from CUI Inc of Tualatin, Oreg. However, if the external device also utilizes the additional signaling capabilities, then a more suitable connector would likely accommodate both the auxiliary output voltage and unidirectional or bidirectional signal or signals 89' in a single physical device. A common connector that may be easily configured to a size suitable for a specific implementation is a right angle header such as AMP 4-103801-0 available from TYCO Industries of Menlo Park, Calif.

One skilled in the art will appreciate that the preceding example, including several component specifications, was intended to utilize a TB voltage of −48 VDC as described. If, however, the additional benefits afforded by a design utilizing a higher TB voltage, for example, up to the 120 VDC ELV limit, then appropriate component and sub-circuit ratings would have to be selected to be compatible with the higher voltage chosen.

Figure 5:
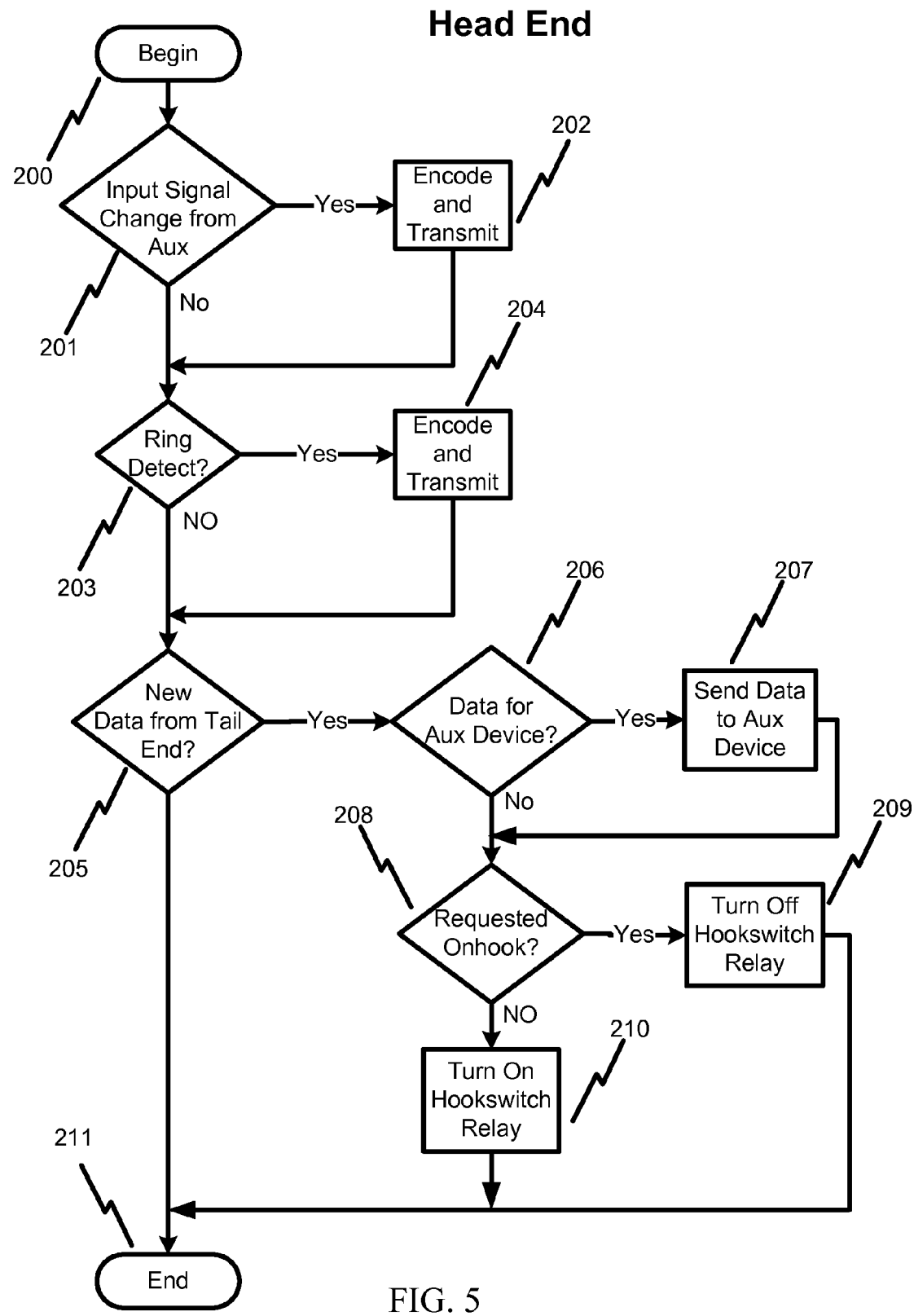
FIG. 5 is a flow diagram depicting one embodiment of the signaling operations as may be implemented at the Head-End of the present invention.

Referring now to FIG. 5, an example implementation of the primary firmware functions of the HE portion of an embodiment of the invention. It is convenient to assume that the auxiliary or external device signaling functions are likely to occur either more frequently, at a greater rate, or should be more responsive to update requests than, for example, the needs relating to basic telephony functions such as ringing or on or off hook transitions. Thus FIG. 5 depicts a simplified overall flow diagram that gives priority to the exchange of external device (auxiliary) signals between connectors 30 and 90 of FIG. 2.

Head End flowchart FIG. 5 depicts the execution logic of a Head End device embodiment. The start point for the logic is the Begin symbol 200 that is the logical equivalent of the End symbol 211, the designation of the endless logic loop Item 200 is the entry point for implementation of the firmware functions of the HE portion of an embodiment of the invention. The overall process described below may be executed within STC 27' of FIG. 3. The upper portion of FIG. 5 depicts an embodiment of a mechanism to address changes occurring at the HE and to encode and forward those changes to a TE embodiment. Likewise, the lower portion of FIG. 5 depicts an embodiment of a mechanism to address encoded signals received from a TE embodiment and to decode those signals to specific signals related to items within or connected to the HE embodiment.

As indicated in the figure, a first decision point 201 determines if any input signals of signal 30' of FIG. 3 associated with an external, that is an auxiliary, device have changed during the interval since the prior execution of the process herein described. If a change has occurred as determined by 201, then process step 202 is executed wherein the change detected, or the resulting new state, is encoded by STC 27' of FIG. 3 onto the one or more carrier signals, and functionally transmitted onto IW 17" of FIG. 3 towards STC 77' of FIG. 4. When process 202 is complete control passes to decision 203. If decision 201 determines that no input signals of signal 30' have changed then control passes directly to decision 203 without executing process 202.

If decision 203 determines that the state of Ringing Detector signal 26' of FIG. 3 has changed then process 204 is executed wherein the change detected, or the resulting new state, is encoded by STC 27' of FIG. 3 onto the one or more carrier signals, and functionally transmitted onto IW 17" of FIG. 3 towards STC 77' of FIG. 4. When process 204 is complete control passes to decision 205. If decision 203 determines that signal of signal 26' has not changed then control passes directly to decision 205 without executing process 204.

Decision 205 determines if new encoded signals have arrived from IW 17" of FIG. 3. If decision 205 determines that no new encoded signals are available to decode then control passes to 211, and the entire process embodiment of FIG. 5 is complete. If decision 205 determines that some new encoded signals are available to decode then control passes to 206.

Decision 206 determines if the new encoded signals include new information or new states directed towards an external or auxiliary device connected to connector 30' of FIG. 3. If decision 206 determines that no new signals are directed towards an external or auxiliary device then control passes to 208. If new encoded signals directed towards an external or auxiliary device are determined to be available then process 207 will decode the new signal or signals onto output signal portions of signal 30' of FIG. 3. When process 207 is complete control passes to decision 208.

Decision 208 determines if the new encoded signals include a request to activate or deactivate relay 23' of FIG. 3 in the HE embodiment. If decision 208 determines that a request to deactivate relay 23' of FIG. 3 has been received, then process 209 will cause signal 29' of FIG. 3 to de-energize relay coil 28' of FIG. 3 to effectively disconnect coupler 31' of FIG. 3 from the SWC signals on signal 15" of FIG. 3. When process 209 is complete control passes to decision 211, and the entire process embodiment of FIG. 5 is complete. If decision 208 determines that a request to activate relay 23' of FIG. 3 has been received then process 210 will cause signal 29' of FIG. 3 to energize relay coil 28' of FIG. 3 to effectively connect coupler 31' of FIG. 3 to the SWC signals on signal 15" of FIG. 3. When process 210 is complete control passes to decision 310 and the entire process embodiment of FIG. 5 is complete.

Figure 6:
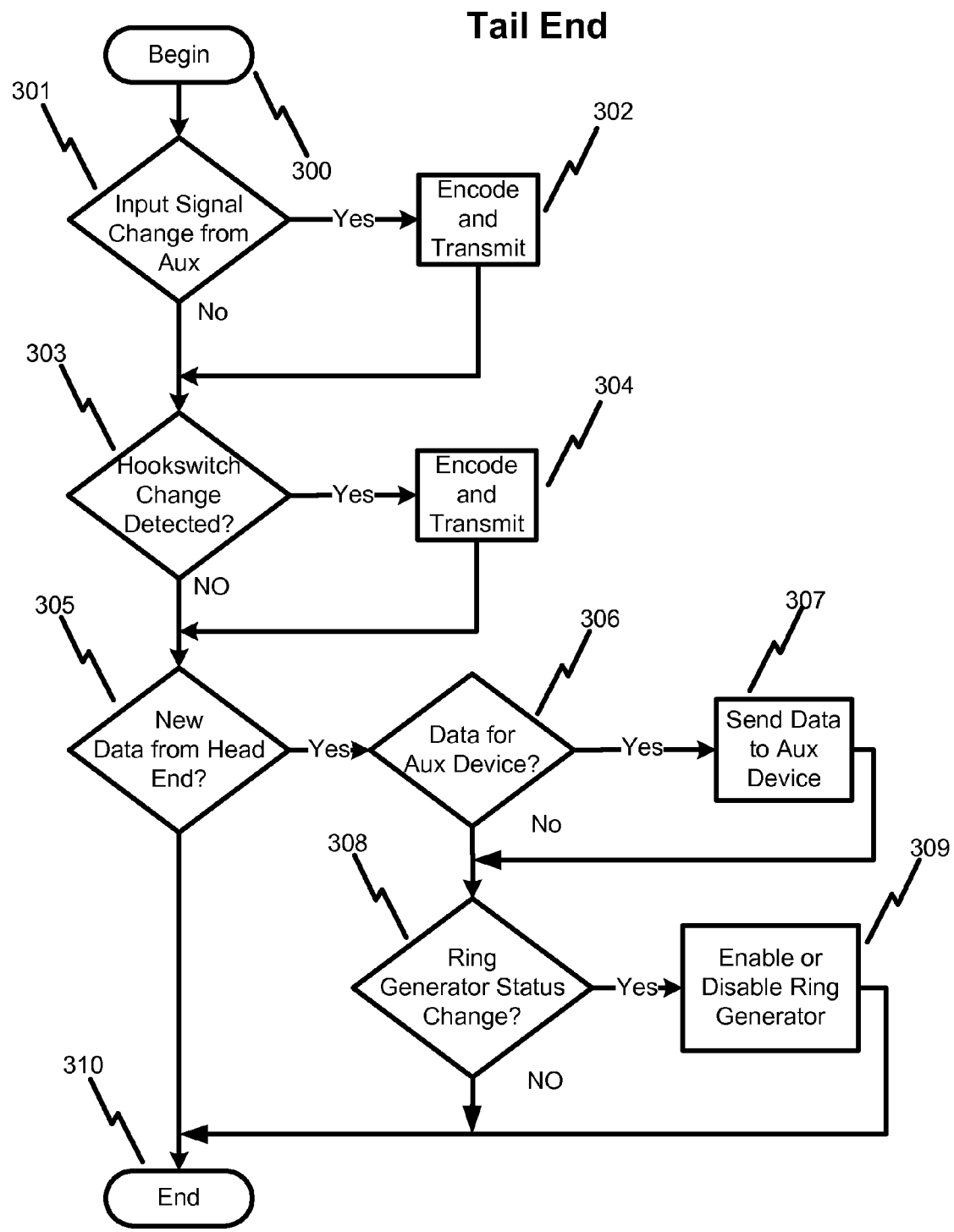
FIG. 6 is a flow diagram depicting one embodiment of the signaling operations as may be implemented at the Tail-End of the present invention.

Referring now to FIG. 6, an example implementation of firmware functions of the TE portion of an embodiment of the invention. With assumptions similar to those mentioned above, FIG. 6 depicts a simplified overall flow diagram that gives priority to the exchange of external device (auxiliary) signals between connectors 30 and 90 of FIG. 2.

Tail End flowchart FIG. 6 depicts the execution logic of a Tail End device embodiment. The start point for the logic is the Begin symbol 200 that is the logical equivalent of the End symbol 211, the designation of an endless logic loop.

Item 300 is the entry point for implementation of the firmware functions of the TE portion of an embodiment of the invention. The overall process described below may be executed within STC 77' of FIG. 4. The upper portion of FIG. 6 depicts an embodiment of a mechanism to address changes occurring at the TE and to encode and forward those changes to a HE embodiment. Likewise, the lower portion of FIG. 6 depicts an embodiment of a mechanism to address encoded signals received from a HE embodiment and to decode those signals to specific signals related to items within or connected to the TE embodiment.

As indicated in the figure, a first decision point 301 determines if any input signals of signal 89' of FIG. 4 associated with an external, that is an auxiliary, device have changed during the interval since the prior execution of the process herein described. If a change has occurred as determined by 301, then process step 302 is executed wherein the change detected, or the resulting new state, is encoded by STC 77' of FIG. 4 onto the one or more carrier signals, and functionally transmitted onto IW 17''' of FIG. 4 towards STC 27' of FIG. 3. When process 302 is complete control passes to decision 303. If decision 301 determines that no input signals of signal 89' have changed then control passes directly to decision 303 without executing process 302.

If decision 303 determines that the state of Off-Hook Detector signal 88' of FIG. 4 has changed, then process 304 is executed wherein the change detected, or the resulting new state, is encoded by STC 77' of FIG. 4 onto the one or more carrier signals and functionally transmitted onto IW 17''' of FIG. 4 towards STC 27' of FIG. 3. When process 304 is complete control passes to decision 305. If decision 303 determines that no input signals of signal 88' have changed, then control passes directly to decision 305.

Decision 305 determines if new encoded signals have arrived from IW 17''' of FIG. 4. If decision 305 determines that no new encoded signals are available to decode then control passes to 310, and the entire process embodiment of FIG. 6 is complete. If decision 305 determines that some new encoded signals are available to decode, then control passes to 306.

Decision 306 determines if the new encoded signals include new information or new states directed towards an external or auxiliary device connected to connector 90' of FIG. 4. If decision 306 determines that no new signals are directed towards an external or auxiliary device then control passes to 308. If new encoded signals directed towards an external or auxiliary device are determined to be available then process 307 will decode the new signal or signals onto output signal portions of signal 89' of FIG. 4. When process 307 is complete control passes to decision 308.

Decision 308 determines if the new encoded signals include a request to activate or deactivate alerting equipment that may be included in the TE embodiment. If decision 308 determines that no new alerting function change signals are included in the new signals then control passes to 310. If decision 308 determines that new alerting function change signals are included in the new signals then process 309 will enable, disable, or cycle the alerting, or ringing embodiments that may be included in the TE embodiment via signal 83' and/or signal 85' of FIG. 4. When process 309 is complete control passes to decision 310, and the entire process embodiment of FIG. 6 is complete.

The foregoing description has been provided with particular reference to deployment of the invention in an incarceration institution. However, the invention may have numerous other advantages. For example, it can be deployed to reduce or eliminate "wall-warts" associated with peripheral telephone devices in a home. It can be used to enable peripheral devices efficiently in other environments where rewiring would not be as economical. For example, it can be used to enable camera capability at a remote existing telephone used for screening access to a physical facility, e.g., a commercial manufacturing facility or office structure, the main gate of a ranch, compound or other real estate of significant size or even with an intercom used at the door of a residence. The invention may be useful in many other applications.

What is claimed is:

1. An apparatus for providing direct current through a two-conductor cable connecting a remote power source to a local communications device having one or more additional capabilities, features and devices that require power in excess of that delivered by a traditional telephone network line, the apparatus comprising:

a low pass filter comprising a split inductor wherein
windings of the split inductor are in series with each of two electrical conductors carrying the direct current and
the split inductor is configured to receive a direct current power signal from the remote power source to produce a filtered direct current power signal, the low pass filter being remote from the local communications device, having a low equivalent series resistance, and having a significant reactance at voice or signaling frequencies thereby mitigating non-DC signal attenuation when the filtered direct current power signal is combined with higher frequency alternating current signals that assist in the operation and control of the local communications device having one or more additional capabilities, features and devices; and one or more protection systems configured to mitigate damage to the power source in the event of a short or other fault condition and having a low equivalent series resistance, the one or more protection systems being selected from (i) one or more resettable fuses having a low equivalent series resistance and (ii) a current foldback circuit.

2. The apparatus of claim 1, wherein the one or more protection systems comprises one or more resettable fuses having a low equivalent series resistance.

3. The apparatus of claim 1, wherein the one or more protection systems comprises a current foldback circuit.

4. The apparatus of claim 1, wherein the one or more protection systems further comprises at least one resettable overvoltage clamp.

5. The apparatus of claim 1, further comprising a bus to combine the filtered direct current power signal from the low pass filter with one or more higher frequency alternating current signals that assist in the operation and control of the local communications device having one or more additional capabilities, features and devices.

6. The apparatus of claim 1, further comprising a bus to combine the filtered direct current power signal from the low pass filter with a higher frequency alternating current signal that enables at least one of: (i) the transmission of data to the local communications device having one or more additional capabilities, features and devices, and (ii) the transmission of data from the local communications device having one or more additional capabilities, features and devices.

7. The apparatus of claim 1, further comprising a bus to combine the filtered direct current power signal from the low pass filter with a higher frequency alternating current signal in the voice frequency range that enables the transmission of voice signals to and from the local communications device having one or more additional capabilities, features and devices.

8. The apparatus of claim 1, wherein the local communications device having one or more additional capabilities, features and devices is employed in an institutional environment and includes a camera communication device for remote visitation and one or more of internet and intranet access for accessing an account and conducting transactions.

9. The apparatus of claim 1, wherein the local communications device having one or more additional capabilities, features and devices includes one or more of: (i) a biometric reader, (ii) a barcode reader, or (iii) an RFID reader, configured to identify or verify the identity of an individual by detection of information embedded within one or more of: (i) a wristband, (ii) a fingerprint, (iii) a palm print, (iv) voice print or speaker recognition, (v) retinal or iris scan, or (vi) other idiosyncratic personal characteristic.

10. The apparatus of claim 1, wherein the local communications device having one or more additional capabilities, features and devices includes one or more of: (i) a still photograph camera, (ii) a video camera, (iii) an internet connectivity device, (iv) an intranet connectivity device, (iv) an analog voice transmission device, and (v) a digital voice transmission device.

11. The apparatus of claim 1, wherein the direct current power signal from the remote power source is supplied at about 48 volts or less and about 25 milliamps or less.

12. The apparatus of claim 1, wherein the direct current power signal from the remote power source is supplied at more than 48 volts up to about 120 volts.

13. The apparatus of claim 1, wherein the direct current power signal from the remote power source is supplied at more than 25 milliamps up to about 550 milliamps.

14. The apparatus of claim 1, wherein the direct current power signal from the remote power source is supplied at more than 25 milliamps up to about 400 milliamps.

15. The apparatus of claim 1, wherein the direct current power signal from the remote power source is supplied at a voltage determined by a current needed at the local communications device and a length of the two-conductor cable.

16. The apparatus of claim 1, wherein the low pass filter has an equivalent series resistance less than 480 Ohms.

17. An apparatus for providing direct current through a two-conductor cable connecting a remote power source to a local communications device having one or more additional capabilities, features and devices that require power in excess of that delivered by a traditional telephone network line and providing at least one high frequency signal for operation and control of the local communications device having one or more additional capabilities, features and devices, the apparatus comprising:

a first low pass filter comprising a split inductor configured to receive a direct current power signal from the remote power source to produce a filtered direct current power signal, the first low pass filter: (i) being remote from the local communications device, (ii) having a low equivalent series resistance, and (iii) having a significant reactance at voice or signaling frequencies thereby reducing non-DC signal attenuation when the filtered direct current power signal is combined with higher frequency alternating current signals that assist in the operation and control of the local communications device having one or more additional capabilities, features and devices;

a first high pass filter configured to filter a high frequency alternating current signal to produce a filtered high frequency alternating current signal, the first high pass filter being employed to mitigate interference between the direct current power signal and the filtered high frequency alternating current signal when combined;

a bus configured to combine the filtered direct current power signal and the filtered high frequency alternating current signal to produce a combined direct current power and high frequency signal to assist in the operation and control of the local communications device having one or more additional capabilities, features and devices;

one or more first protection systems configured to mitigate damage to the power source in the event of a short or other fault condition and having a low equivalent series resistance, the one or more protection systems being selected from (i) one or more resettable fuses having a low equivalent series resistance and (ii) a current foldback circuit;

a two-conductor cable configured to transmit the combined direct current power and high frequency signal to one or more second protection systems associated with the local communications device having one or more additional capabilities, features and devices;

a second protection system configured to mitigate damage in the event of a short or other fault condition;

a second low pass filter configured to receive at least a portion of the combined direct current power and high frequency signal from the second protection system to produce a local premises direct current power signal;

a second high pass filter configured to receive at least a portion of the combined direct current power and high frequency signal from the protection system to produce at least one local premises high frequency signal; and one or more connectors configured to transmit the local premises direct current power signal and the local premises high frequency signal to the local communications device having one or more additional capabilities, features or devices to assist in their operation and control.

18. The apparatus of claim 17, wherein the second low pass filter comprises a split inductor.

19. The apparatus of claim 17, wherein the first protection systems comprises at least one resettable fuse having a low equivalent series resistance.

20. The apparatus of claim 17, wherein the first protection systems comprises a current foldback circuit.

21. The apparatus of claim 17, wherein the one or more second protection systems comprises at least one resettable fuse having a low equivalent series resistance.

22. The apparatus of claim 17, wherein the bus is configured to combine the filtered direct current power signal from the first low pass filter with a filtered high frequency alternating current signal outside a voice frequency range.

23. The apparatus of claim 1 wherein the low pass filter comprises a split inductor and a capacitor.

24. The apparatus of claim 17 wherein the low pass filter comprises a split inductor and a capacitor.

* * * * *